US012462177B2

(12) United States Patent
Kumph

(10) Patent No.: US 12,462,177 B2
(45) Date of Patent: Nov. 4, 2025

(54) DUAL-MULTIPLEXER FILTRATION OF INPUTTED QUBIT READOUT SIGNALS

(71) Applicant: International Business Machines Corporation, Armonk, NY (US)

(72) Inventor: Muir Kumph, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 740 days.

(21) Appl. No.: 17/806,862

(22) Filed: Jun. 14, 2022

(65) Prior Publication Data

US 2023/0401473 A1 Dec. 14, 2023

(51) Int. Cl.
G06N 10/40 (2022.01)

(52) U.S. Cl.
CPC ........................... *G06N 10/40* (2022.01)

(58) Field of Classification Search
CPC ........................................ G06N 10/40
See application file for complete search history.

(56) References Cited

U.S. PATENT DOCUMENTS

| | | | |
|---|---|---|---|
| 9,870,536 B1 | 1/2018 | Abdo | |
| 10,043,136 B1 * | 8/2018 | Abdo | F25B 9/12 |
| 10,133,985 B2 | 11/2018 | Abdo | |
| 11,201,686 B1 * | 12/2021 | Ritter | H04B 10/66 |
| 2021/0232364 A1 * | 7/2021 | Swenson | G06N 10/60 |
| 2021/0384404 A1 * | 12/2021 | Finck | H10N 60/12 |

FOREIGN PATENT DOCUMENTS

WO 2020139407 A1 7/2020

OTHER PUBLICATIONS

Lecocq, et al., Control and Readout of a Superconducting Qubit Using a Photonic Link, Nature 591, No. 7851, pp. 575-579, arXiv:2009.01167v1 [quant-ph], 2020, 13 pgs.
International Search Report and Written Opinion received for PCT Application Serial No. PCT/EP2023/064157 dated Sep. 14, 2023, 12 pages.
Manenti et al., "Full Control of Superconducting Qubits with Combined on-chip Microwave and Flux Lines", Applied Physics Letters, vol. 119, No. 144001, Oct. 4, 2021, 6 pages.

\* cited by examiner

*Primary Examiner* — Nghia M Doan
(74) *Attorney, Agent, or Firm* — Amin, Turocy & Watson, LLP

(57) ABSTRACT

Systems and techniques that facilitate dual-multiplexer filtration of inputted qubit readout signals are provided. In various embodiments, a device can comprise a cable that can transmit an input signal to a qubit. In various aspects, the input signal can include at least one qubit readout signal and at least one qubit control signal. In various instances, the device can further comprise a dual-multiplexer circuit located along the cable. In various cases, the dual-multiplexer circuit can selectively attenuate the at least one qubit readout signal.

20 Claims, 9 Drawing Sheets

DUAL-MULTIPLEXER FILTRATION OF INPUTTED QUBIT READOUT SIGNALS

BACKGROUND

The subject disclosure relates to qubit readout, and more specifically to dual-multiplexer filtration of inputted qubit readout signals.

To drive a qubit, an input signal is generated at room temperature, where the input signal is often made up of a qubit control signal at a given frequency and a qubit readout signal at a different frequency. To obtain adequate performance of the qubit, it can be desired to attenuate the qubit readout signal without attenuating the qubit control signal. Unfortunately, existing techniques are not able to facilitate such attenuation without excessive thermal noise, excessive room temperature amplification, and/or excessive signal ripples.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus, and/or computer program products that can facilitate dual-multiplexer filtration of inputted qubit readout signals are described.

According to one or more embodiments, a device is provided. In various aspects, the device can comprise a cable that can be configured to transmit an input signal to a qubit. In various instances, the input signal can include at least one qubit readout signal and at least one qubit control signal. In various cases, the device can further comprise a dual-multiplexer circuit located along the cable. In various aspects, the dual-multiplexer circuit can be configured to selectively attenuate the at least one qubit readout signal. In various instances, the dual-multiplexer circuit can include a first multiplexer and a second multiplexer coupled together by a set of wires. In various cases, at least one first wire of the set of wires can be outfitted with one or more attenuators. In various aspects, the first multiplexer can be configured to frequency-split the input signal into the at least one qubit readout signal and the at least one qubit control signal. In various instances, the at least one first wire can be configured to pass the at least one qubit readout signal through the one or more attenuators thereby yielding at least one attenuated qubit readout signal. In various cases, the at least one first wire can be configured to transmit the at least one attenuated qubit readout signal to the second multiplexer. In various aspects, a remainder of the set of wires can be configured to transmit the at least one qubit control signal to the second multiplexer. In various instances, the second multiplexer can be configured to frequency-combine the at least one qubit control signal with the at least one attenuated qubit readout signal.

According to one or more embodiments, an apparatus is provided. In various embodiments, the apparatus can comprise a signal generator coupled, by an input cable, to a qubit. In various aspects, the apparatus can further comprise a dual-multiplexer circuit fabricated on the input cable. In various instances, the dual-multiplexer circuit can comprise: a first multiplexer and a second multiplexer; at least one first wire coupling the first multiplexer to the second multiplexer, wherein the at least one first wire can lack any attenuators; and/or at least one second wire coupling the first multiplexer to the second multiplexer, wherein the at least one second wire can be outfitted with at least one attenuator.

In various embodiments, the above-described device and/or apparatus can be implemented as methods.

DETAILED DESCRIPTION

Figure 1:
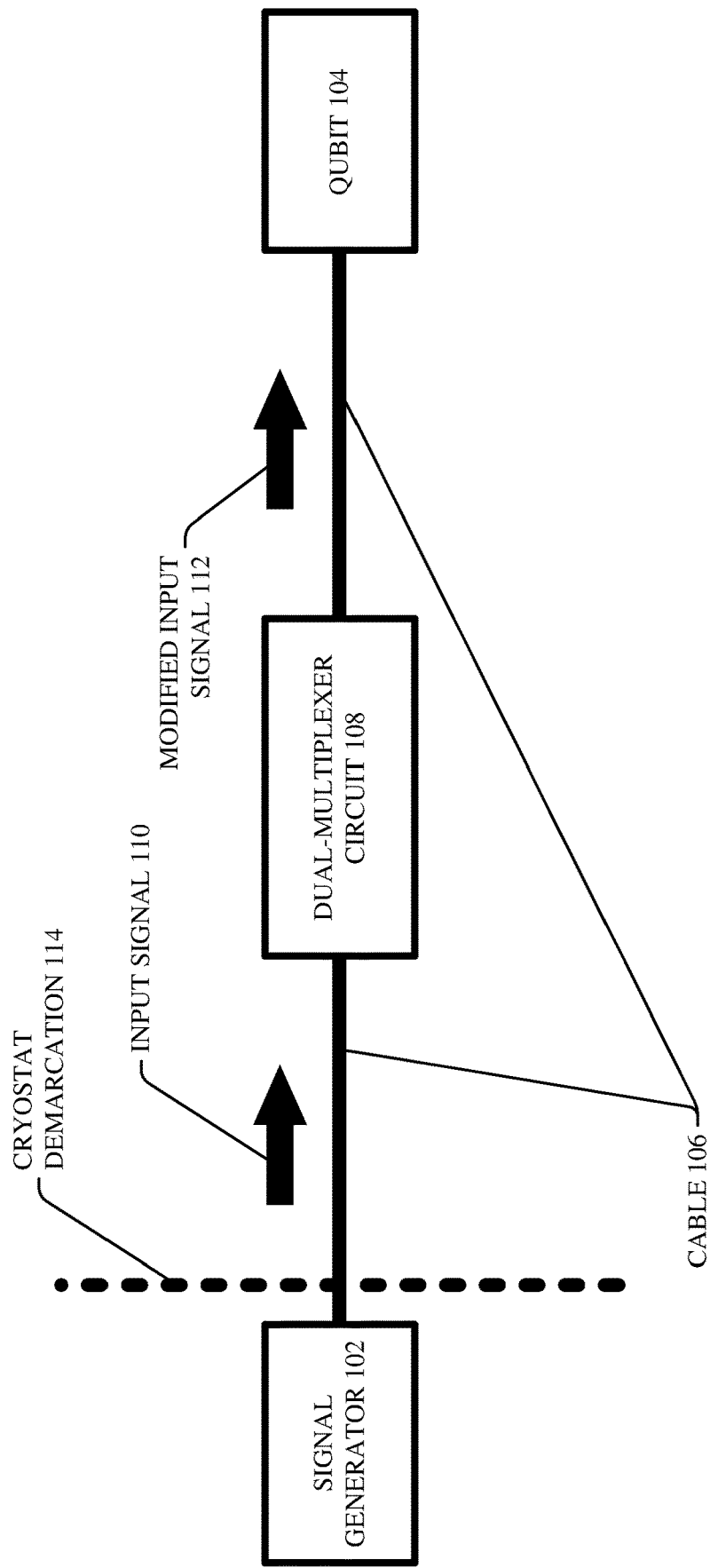
FIG. 1 illustrates a block diagram of an example, non-limiting system that facilitates dual-multiplexer filtration of inputted qubit readout signals in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

To drive a qubit (e.g., a superconducting qubit, such as a transmon), an input signal (e.g., a microwave tone and/or pulse having any suitable frequency, amplitude, and/or phase) can be generated by any suitable signal generation equipment (e.g., voltage/amperage oscillators) at room temperature (e.g., at non-cryogenic temperatures). Often, the input signal can be made up of a qubit control signal (e.g., a constituent microwave tone/pulse having any suitable amplitude and/or phase) that exhibits a given frequency and can also be made up of a qubit readout signal (e.g., another constituent microwave tone/pulse having any suitable amplitude and/or phase) that exhibits a different frequency. That is, the input signal can be considered as a frequency-multiplexed signal. In various cases, the qubit control signal can represent and/or encode one or more quantum gates to be performed on the qubit, and/or the qubit readout signal can represent and/or encode a query for a readout resonator associated with (e.g., coupled to) the qubit.

To obtain adequate performance of the qubit, it can be desired to attenuate the qubit readout signal without attenuating the qubit control signal. More specifically, the qubit can rely on a cavity quantum electrodynamics resonator to read its state. Such cavity can be coupled to the room temperature electronics (e.g., the voltage/amperage oscillator) that generate the input signal for the qubit. If excessive thermal photons from the room temperature electronics are permitted to enter such cavity, the decoherence time of the qubit can be adversely affected. To prevent and/or impede thermal photons from entering the cavity, sufficient attenuation (e.g., on the order of 60 decibels of attenuation) can be required to be applied to the qubit readout signal. However, if such attenuation were also applied to the qubit control signal, the qubit would be exceedingly slow in performing quantum gates. Accordingly, it can be desired to attenuate the qubit readout signal (e.g., to prevent thermal photons from entering the readout cavity) while preserving the qubit control signal (e.g., to prevent quantum gates from operating too slowly).

Unfortunately, existing techniques are not able to facilitate such attenuation without excessive thermal noise, excessive room temperature amplification, and/or excessive signal ripples. In particular, some existing techniques involve controlling the room temperature electronics so that the input signal is created with an initially-attenuated and/or otherwise low-amplitude qubit readout signal and with an unattenuated and/or otherwise high-amplitude qubit control signal. However, such existing techniques are not capable of achieving sufficient attenuation of the qubit readout signal. That is, when the qubit readout signal is attenuated at room temperature, the qubit readout signal can still have too much thermal noise (e.g., can still introduce too many thermal photons to the readout cavity), which can adversely affect the decoherence time of the qubit.

Other existing techniques involve passing the input signal through one or more attenuators at cryogenic temperatures. Although this can sufficiently attenuate the qubit readout signal, it also attenuates the qubit control signal, thereby yielding slow execution of quantum gates. Such existing techniques attempt to rectify this issue by controlling the room temperature electronics so that the qubit control signal is initially extremely amplified. However, such extreme amplification can be resource intensive and/or otherwise problematic.

Yet other existing techniques involve passing the input signal through a low-pass filter at cryogenic temperatures, at least when the qubit control frequency is lower than the qubit readout frequency. In such a case, the qubit control signal can be in the pass-band of the low-pass filter, and the qubit readout signal can be in the stop-band of the low-pass filter. Accordingly, the low-pass filter can be considered as allowing the qubit control signal to pass unattenuated, and can further be considered as allowing a significantly attenuated version of the qubit readout signal to pass. Although this can sufficiently attenuate the qubit readout signal, it results in the creation of excessive ripples in the qubit readout signal and/or can otherwise cause the qubit readout signal to have an excessively large dynamic range.

Accordingly, systems and/or techniques that can address one or more of these technical problems can be desirable.

Various embodiments described herein can address one or more of these technical problems. Specifically, various embodiments described herein can provide systems and/or techniques that can facilitate dual-multiplexer filtration of inputted qubit readout signals. In other words, the present inventors of various embodiments described herein devised a circuit structure/architecture that can receive an input signal composed of a qubit readout signal and a qubit control signal, and/or that can selectively attenuate the qubit readout signal without attenuating (e.g., while preserving/maintaining) the qubit control signal. Moreover, as described herein, such circuit structure/architecture can facilitate such selective attenuation of the qubit readout signal without introducing excessive thermal noise, without involving excessive room temperature amplification, and/or without causing excessive ripples in the qubit readout signal.

In particular, a cable can couple a signal generator to a qubit. In various aspects, the cable can be made of any suitable superconducting materials and/or can exhibit any suitable sizes, shapes, and/or dimensions. In various instances, the signal generator can be any suitable oscillator (and/or ensemble of oscillators) that is controllable to generate microwave tones, pulses, and/or signals having any suitable frequencies, any suitable amplitudes, and/or any suitable phases. In various cases, the qubit can exhibit any suitable superconducting qubit architecture (e.g., transmon qubit) that involves one or more Josephson junctions, one or more shunting capacitor pads, and/or one or more inductance loops. In various aspects, the signal generator can be located within a non-cryogenic temperature stage (e.g., can be located at room temperature). In contrast, the qubit can be located in a cryogenic temperature stage (e.g., can be located within a cryostat). Accordingly, some portion of the cable can be in the non-cryogenic temperature stage, and a remainder of the cable can be within the cryogenic temperature stage.

In various instances, the signal generator can generate an input signal, and the cable can transmit the input signal to the qubit (e.g., the signal can propagate/travel along the cable toward the qubit). In various cases, the input signal can be made up of a qubit control signal that exhibits a first frequency and can further be made up of a qubit readout signal that exhibits a second frequency that is different from the first frequency. In some aspects, the first frequency can be less than the second frequency. In other aspects, the first frequency can be greater than the second frequency. In any case, the qubit control signal can exhibit any suitable amplitude and/or any suitable phase, and the qubit control signal can represent one or more quantum gates (e.g., Pauli-X gates, Pauli-Y gates, Pauli-Z gates, Phase gates, Controlled-Not gates) that are to be performed by and/or on the qubit. In various instances, the qubit readout signal can exhibit any suitable amplitude and/or any suitable phase, and the qubit readout signal can represent a state measurement query that is directed to and/or otherwise intended for any suitable readout resonator that is coupled to the qubit.

In various aspects, there can be a dual-multiplexer circuit that is located on that portion of the cable that is within the cryogenic temperature stage. In various instances, as described herein, the dual-multiplexer circuit can selectively attenuate the qubit readout signal without attenuating the qubit control signal. More specifically, the dual-multiplexer circuit can include a first multiplexer and a second multiplexer. In various aspects, the first multiplexer can include a first frequency filter, the second multiplexer can include a second frequency filter, and a first wire can couple the first frequency filter to the second frequency filter. In various instances, the first frequency filter can be any suitable frequency-selective filtration circuit as desired (e.g., can be any suitable low-pass filter comprising one or more resistors, one or more inductors, and/or one or more capacitors arranged in any suitable fashion; can be any suitable high-pass filter comprising one or more resistors, one or more inductors, and/or one or more capacitors arranged in any suitable fashion; and/or can be any suitable band-pass filter comprising one or more resistors, one or more inductors, and/or one or more capacitors arranged in any suitable fashion). In any case, the first frequency of the qubit control signal can be within a pass-band of the first frequency filter, and the second frequency of the qubit readout signal can be within a stop-band of the first frequency filter. In various aspects, the second frequency filter of the second multiplexer can be the same as and/or can otherwise mirror the first frequency filter of the first multiplexer. Accordingly, the second frequency filter can be considered as having the same pass-band as the first frequency filter and/or as having the same stop-band as the first frequency filter. In various instances, the first wire can be made up of any suitable superconducting materials and/or can exhibit any suitable sizes, shapes, and/or dimensions.

In various cases, the first multiplexer can further include a third frequency filter, the second multiplexer can include a fourth frequency filter, and a second wire can couple the third frequency filter to the fourth frequency filter. In various aspects, the third frequency filter can be any suitable frequency-selective filtration circuit as desired (e.g., can be any suitable low-pass filter comprising one or more resistors, one or more inductors, and/or one or more capacitors arranged in any suitable fashion; can be any suitable high-pass filter comprising one or more resistors, one or more inductors, and/or one or more capacitors arranged in any suitable fashion; and/or can be any suitable band-pass filter comprising one or more resistors, one or more inductors, and/or one or more capacitors arranged in any suitable fashion). In any case, the first frequency of the qubit control signal can be within a stop-band of the third frequency filter, and the second frequency of the qubit readout signal can be within a pass-band of the third frequency filter. In various aspects, the fourth frequency filter of the second multiplexer can be the same as and/or can otherwise mirror the third frequency filter of the first multiplexer. Accordingly, the fourth frequency filter can be considered as having the same pass-band as the third frequency filter and/or as having the same stop-band as the third frequency filter. In various instances, the second wire can be made up of any suitable superconducting materials and/or can exhibit any suitable sizes, shapes, and/or dimensions. Moreover, there can be one or more attenuators on and/or along the second wire. Such one or more attenuators can exhibit any suitable architectures/structures as desired (e.g., can be nickel-chrome attenuators, can be directional-coupler attenuators).

In various aspects, the input signal can be received by both the first frequency filter of the first multiplexer and the third frequency filter of the first multiplexer. Because the first frequency of the qubit control signal can be in the pass-band of the first frequency filter, the qubit control signal can pass through the first frequency filter. However, because the second frequency of the qubit readout signal can be in the stop-band of the first frequency filter, the qubit readout signal can fail to pass through the first frequency filter. Accordingly, the qubit control signal, and not the qubit readout signal, can travel/propagate along the first wire. Similarly, because the first frequency of the qubit control signal can be in the stop-band of the third frequency filter, the qubit control signal can fail to pass through the third frequency filter. However, because the second frequency of the qubit readout signal can be in the pass-band of the third frequency filter, the qubit readout signal can pass through the third frequency filter. Accordingly, the qubit readout signal, and not the qubit control signal, can travel/propagate along the second wire. In other words, the first multiplexer can be considered as splitting (e.g., frequency-splitting) the input signal into the qubit control signal and the qubit readout signal.

In various aspects, the first wire can transmit the qubit control signal to the second frequency filter of the second multiplexer. In various instances, on the other hand, the second wire can transmit the qubit readout signal to the one or more attenuators. In various cases, the one or more attenuators can diminish the amplitude of the qubit readout signal, thereby yielding an attenuated qubit readout signal. In various aspects, as those having ordinary skill in the art will appreciate, the amount and/or scale of attenuation can be controlled by commensurately controlling (e.g., during fabrication) the characteristics of the one or more attenuators (e.g., by controlling the materials that make up the one or more attenuators; by controlling the resistances, capacitances, and/or inductances of the circuit elements that make up the one or more attenuators; by controlling the sizes, shapes, and/or dimensions of the one or more attenuators). In any case, the qubit readout signal can be become the attenuated qubit readout signal by passing through the one or more attenuators, and the second wire can transmit the attenuated qubit readout signal to the fourth frequency filter of the second multiplexer.

In various aspects, after the qubit control signal passes through the second frequency filter of the second multiplexer, and after the attenuated qubit readout signal passes through the fourth frequency filter of the second multiplexer, the qubit control signal and the attenuated qubit readout signal can merge together onto the cable. Accordingly, the second multiplexer can be considered as combining (e.g., frequency-combining) the qubit control signal and the attenuated qubit readout signal into a modified version of the input signal. The cable can then transmit that modified version of the input signal to the qubit and/or to the readout resonator coupled to the qubit.

In any case, the dual-multiplexer circuit can be considered as attenuating the qubit readout signal while simultaneously preserving/maintaining (e.g., while not attenuating, and/or while at most negligibly attenuating) the qubit control signal. In other words, the dual-multiplexer circuit can be considered as selectively attenuating the qubit readout signal. Accordingly, thermal photons can be prevented and/or impeded from entering the readout resonator (e.g., due to the attenuation of the qubit readout signal), and quantum gates can nevertheless be performed on and/or by the qubit without excessive slowness (e.g., due to the lack of attenuation of the qubit control signal). Moreover, note that the dual-multiplexer circuit can avoid introducing excessive thermal noise to the qubit and/or to the readout resonator, unlike various existing techniques (e.g., because the dual-multiplexer circuit can be located within the cryostat and/or cryogenic temperature stage, the dual-multiplexer circuit can be considered as performing cryogenic attenuation instead of room temperature attenuation). Furthermore, note that the dual-multiplexer circuit can avoid requiring excessive room temperature amplification, unlike various existing techniques (e.g., because the dual-multiplexer circuit can avoid attenuating the qubit control signal and/or can otherwise at most negligibly attenuate the qubit control signal, there can be no need for the signal generator to excessively amplify the qubit control signal). Further still, as experimentally verified by the present inventors, the dual-multiplexer circuit can avoid introducing excessive ripples into the qubit readout signal, unlike various existing techniques. Accordingly, the dual-multiplexer circuit can selectively attenuate the qubit readout signal without experiencing the concomitant disadvantages that plague various existing techniques.

Various embodiments can be employed to use hardware and/or software to solve problems that are highly technical in nature (e.g., to facilitate dual-multiplexer filtration of inputted qubit readout signals), that are not abstract, that are not mere laws of nature, that are not mere natural phenomena, and that cannot be performed as a set of mental acts by a human. Instead, various embodiments described herein include tangible electric circuit structures/architectures and/or methodologies pertaining to such tangible electric circuit structures/architectures that can be implemented so as to selectively attenuate an inputted qubit readout signal without attenuating an inputted qubit control signal that corresponds to the inputted qubit readout signal. Indeed, as mentioned above, existing techniques cannot facilitate such selective attenuation without experiencing excessive thermal noise (e.g., suffered by existing techniques that utilize room temperature attenuators), excessive room temperature amplification (e.g., suffered by existing techniques that utilize cryogenic attenuators), and/or excessive signal ripples (e.g., suffered by existing techniques that replace cryogenic attenuators with cryogenic low-pass filters).

In contrast, various embodiments described herein can address one or more of such technical problems. Specifically, systems/techniques described herein can include a cable that can transmit an input signal from a signal generator to a qubit, where the input signal can be made up of a qubit control signal at some frequency and a qubit readout signal at a different frequency. In various aspects, the qubit can be within a cryostat, and the signal generator can be outside of the cryostat. Moreover, such systems/techniques can further include a dual-multiplexer circuit that is located and/or fabricated along a portion of the cable that is within a cryostat. In various instances, the dual-multiplexer circuit can include a first multiplexer and a second multiplexer. In various cases, the first multiplexer can have a first frequency filter whose stop-band encapsulates the qubit readout signal and whose pass-band encapsulates the qubit control signal. In various aspects, the second multiplexer can have a second frequency filter that mirrors the first frequency filter and that is coupled to the first frequency filter by a first wire. Furthermore, the first multiplexer can have a third frequency filter whose stop-band encapsulates the qubit control signal and whose pass-band encapsulates the qubit readout signal. In various instances, the second multiplexer can have a fourth frequency filter that mirrors the third frequency filter and that is coupled to the third frequency filter by a second wire. Further still, in various cases, the second wire can be outfitted with any suitable number and/or types of attenuators. Accordingly, the input signal can be processed by the dual-multiplexer circuit as follows: the input signal can be received by the first frequency filter and the third frequency filter of the first multiplexer; the qubit control signal can pass through the first frequency filter and onto the first wire, whereas the qubit readout signal can fail to pass through the first frequency filter; the qubit readout signal can pass through the third frequency filter and onto the second wire, whereas the qubit control signal can fail to pass through the third frequency filter; the attenuators of the second wire can attenuate/diminish the qubit readout signal; the first wire can transmit the qubit control signal to the second frequency filter of the second multiplexer; the second wire can transmit the attenuated/diminished qubit readout signal to the fourth frequency filter of the second multiplexer; and the qubit control signal and the attenuated/diminished qubit readout signal can merge together within the second multiplexer. Accordingly, the result of such processing by the dual-multiplexer circuit can be a modified version of the input signal, which modified version includes the attenuated/diminished qubit readout signal and an unattenuated/undiminished (or at most negligibly attenuated/diminished) qubit control signal. Because the qubit readout signal can be attenuated/diminished, thermal photons can be prevented/impeded from entering a readout cavity associated with the qubit. However, because the qubit control signal can be unattenuated/undiminished, quantum gates can be performed on/by the qubit without excessive slowness.

Moreover, because the dual-multiplexer circuit can be located within the cryostat, the dual-multiplexer circuit can be considered as implementing cryogenic attenuation, which can result in less thermal noise as compared to existing techniques that utilize room temperature attenuation.

Furthermore, because the dual-multiplexer circuit can avoid non-negligibly attenuating/diminishing the qubit control signal, there can be no need for excessive room temperature amplification of the qubit control signal, which can be a benefit as compared to existing techniques that utilize cryogenic attenuation.

Further still, the present inventors experimentally verified that the dual-multiplexer circuit can facilitate selective attenuation of the qubit readout signal without introducing excessive signal ripples, which can be another benefit as compared to existing techniques that replace cryogenic attenuation with cryogenic low-pass filtration.

Because various embodiments described herein can mitigate the problems (e.g., excessive thermal noise, excessive room temperature amplification, excessive signal ripples) associated with existing techniques, such embodiments certainly constitute a concrete and tangible technical improvement in the field of qubit readout.

Moreover, it must be emphasized that various embodiments described herein are not directed to mere transitory signals and/or propagating waveforms. As explained herein, various embodiments can solve the technical problems of excessive thermal noise, excessive room temperature amplification, and/or excessive signal ripples that are associated with existing techniques for selectively attenuating qubit readout signals. Specifically, as described herein, the present inventors devised a solution to these technical problems, where such solution includes constructing a dual-multiplexer circuit, where such dual-multiplexer circuit frequency-splits (e.g., by a first multiplexer) an input signal into a qubit readout signal and a qubit control signal, attenuates the qubit readout signal (e.g., by one or more attenuators located on the wire along which the qubit readout signal propagates), preserves the qubit control signal (e.g., due to absence of attenuators along the wire along which the qubit control signal propagates), and frequency-combines (e.g., by a second multiplexer) the qubit control signal with the attenuated version of the qubit readout signal. Accordingly, various embodiments described herein cannot be intelligently explained without discussing/describing qubit readout signals/tones/pulses, qubit control signals/ tones/pulses, and/or the directions of propagation of such signals/tones/pulses. Despite such description/discussion of signals/tones/pulses, various embodiments described herein are not directed to such signals/tones/pulses without significantly more. Instead, such embodiments are directed to the concrete, tangible, and non-transitory circuit structures/architectures that manipulate and/or guide such signals/tones/ pulses (e.g., cable, first multiplexer comprising various frequency filters, second multiplexer comprising various frequency filters, set of wires coupling the first multiplexer to the second multiplexer, attenuators fabricated on some of such set of wires).

Furthermore, various embodiments described herein can control tangible, hardware-based devices based on the disclosed teachings. For example, embodiments can include tangible qubits (e.g., superconducting qubits made up of Josephson junctions and/or induction loops) and/or tangible multiplexers, tangible attenuators, and/or tangible cables/ wires that can transmit and/or attenuate inputted control/ readout signals for such tangible qubits.

It should be appreciated that the figures and the herein disclosure describe non-limiting examples of various embodiments. It should further be appreciated that the figures are not necessarily drawn to scale.

FIG. 1 illustrates a block diagram of an example, non-limiting system 100 that can facilitate dual-multiplexer filtration of inputted qubit readout signals in accordance with one or more embodiments described herein.

As shown, the system 100 can include a signal generator 102. In various embodiments, the signal generator 102 can be any suitable type of voltage oscillator and/or amperage oscillator that can controllably create electromagnetic waveforms, electromagnetic signals, electromagnetic tones, and/ or electromagnetic pulses having any suitable amplitudes, any suitable frequencies, any suitable phases, and/or any suitable durations. As those having ordinary skill in the art will appreciate, the signal generator 102 can have configurable parameters/settings, and the controlled adjustment of such configurable parameters/settings can commensurately adjust the amplitudes, frequencies, phases, and/or durations of waveforms, signals, tones, and/or pulses produced by the signal generator 102. Although FIG. 1 depicts a single instance of the signal generator 102, this is a mere non-limiting example for ease of illustration. In various cases, any suitable number of instances (e.g., two or more) of the signal generator 102 can be implemented.

In various aspects, as shown, the system 100 can further comprise a qubit 104. In various instances, the qubit 104 can exhibit any suitable type of qubit architecture. As a non-limiting example, the qubit 104 can be a superconducting qubit that is made up of one or more Josephson junctions shunted by one or more planar capacitor pads, such as a transmon qubit and/or a tunable coupler qubit. In other cases, however, the qubit 104 can exhibit any other suitable qubit architecture, such as a quantum dot architecture. Although FIG. 1 depicts a single instance of the qubit 104, this is a mere non-limiting example for ease of illustration. In various cases, any suitable number of instances (e.g., two or more) of the qubit 104 can be implemented.

In various cases, as shown, the signal generator 102 and the qubit 104 can be coupled together by a cable 106. In various instances, the cable 106 can be composed of any suitable superconducting materials. Furthermore, in various cases, the cable 106 can exhibit any suitable shapes, sizes, and/or dimensions.

In various aspects, the qubit 104 can be physically located within any suitable cryostat (e.g., any suitable cryogenic temperature stage). In contrast, the signal generator 102 can be physically located outside of such cryostat. In other words, the qubit 104 can be implemented at cryogenic temperatures, and/or the signal generator 102 can be implemented at non-cryogenic temperatures (e.g., at room temperature). Because the cable 106 can couple the signal generator 102 to the qubit 104, some portion of the cable 106 can be physically located outside of the cryostat, and/or some remaining portion of the cable 106 can be physically located within the cryostat. In various instances, the cryostat demarcation 114 can be considered as representing and/or indicating the boundary of the cryostat. Accordingly, the depicted components of the system 100 that are to the left of the cryostat demarcation 114 (e.g., the signal generator 102, some portion of the cable 106) can be considered as being implemented outside of the cryostat. On the other hand, the depicted components of the system 100 that are to the right of the cryostat demarcation 114 (e.g., the qubit 104, a remainder of the cable 106) can be considered as being implemented inside of the cryostat.

In various embodiments, as shown, a dual-multiplexer circuit 108 can be physically located and/or fabricated along the portion of the cable 106 that is within the cryostat. The internal structure/architecture of the dual-multiplexer circuit 108 will be described in more detail herein with respect to the remain figures.

In any case, the signal generator 102 can electronically generate an input signal 110. In various aspects, the input signal 110 can be any suitable electromagnetic waveform, tone, and/or pulse exhibiting any suitable frequencies, any suitable amplitudes, and/or any suitable phases. In various instances, the input signal 110 can be a frequency-multiplexed signal that includes and/or is otherwise made up of any suitable number of constituent signals. More specifically, the input signal 110 can be made up of a set of qubit control signals and/or a set of qubit readout signals. In various cases, the set of qubit control signals can include any suitable number of qubit control signals, each of which can exhibit a unique frequency. Likewise, the set of qubit readout signals can include any suitable number of qubit readout signals, each of which can exhibit a unique frequency. In other words, the set of qubit control signals can be considered as having frequencies that are disjoint with each other, the set of qubit readout signals can be considered as having frequencies that are disjoint with each other, and the frequencies of the set of qubit control signals can be disjoint with the frequencies of the set of qubit readout signals. In various aspects, a qubit control signal can be any suitable electromagnetic waveform, tone, and/or pulse that encodes and/or otherwise represents one or more quantum gates that can be performed on and/or by the qubit 104. In contrast, a qubit readout signal can be any suitable electromagnetic waveform, tone, and/or pulse that encodes and/or otherwise represents a measurement query that is directed to a readout resonator (not shown) coupled to the qubit 104. As those having ordinary skill in the art will appreciate, such readout resonator can have any suitable structure/architecture as desired. As a non-limiting example, such readout resonator can be a cavity quantum electrodynamics readout resonator.

In various instances, as shown, the cable 106 can transmit the input signal 110 to the dual-multiplexer circuit 108. In various cases, as described herein, the dual-multiplexer circuit 108 can selectively attenuate the set of qubit readout signals without attenuating (and/or while at most negligibly attenuating) the set of qubit control signals. More specifically, the dual-multiplexer circuit 108 can: split the input signal 110 into the set of qubit readout signals and the set of qubit control signals; attenuate and/or otherwise diminish each of the set of qubit readout signals; refrain from attenuating and/or otherwise diminishing the set of qubit control signals; and recombine the set of qubit control signals with the set of attenuated qubit readout signals. The result of such recombination can be considered as the modified input signal 112. Accordingly, as shown, the cable 106 can transmit the modified input signal 112 to the qubit 104. Note that, because the dual-multiplexer circuit 108 can refrain from attenuating/diminishing the set of qubit control signals (e.g., because the dual-multiplexer circuit 108 can at most negligibly attenuate/diminish the set of qubit control signals), the modified input signal 112 can cause the qubit 104 to undergo any suitable number of any suitable quantum gates without experiencing excessive slowness. Moreover, note that, because the dual-multiplexer circuit 108 can attenuate/diminish the set of qubit readout signals (e.g., because the dual-multiplexer circuit 108 can non-negligibly attenuate/diminish the set of qubit readout signals), the modified input signal 112 can refrain from introducing excessive thermal noise into the readout resonator that is coupled to the qubit 104.

Figure 2:
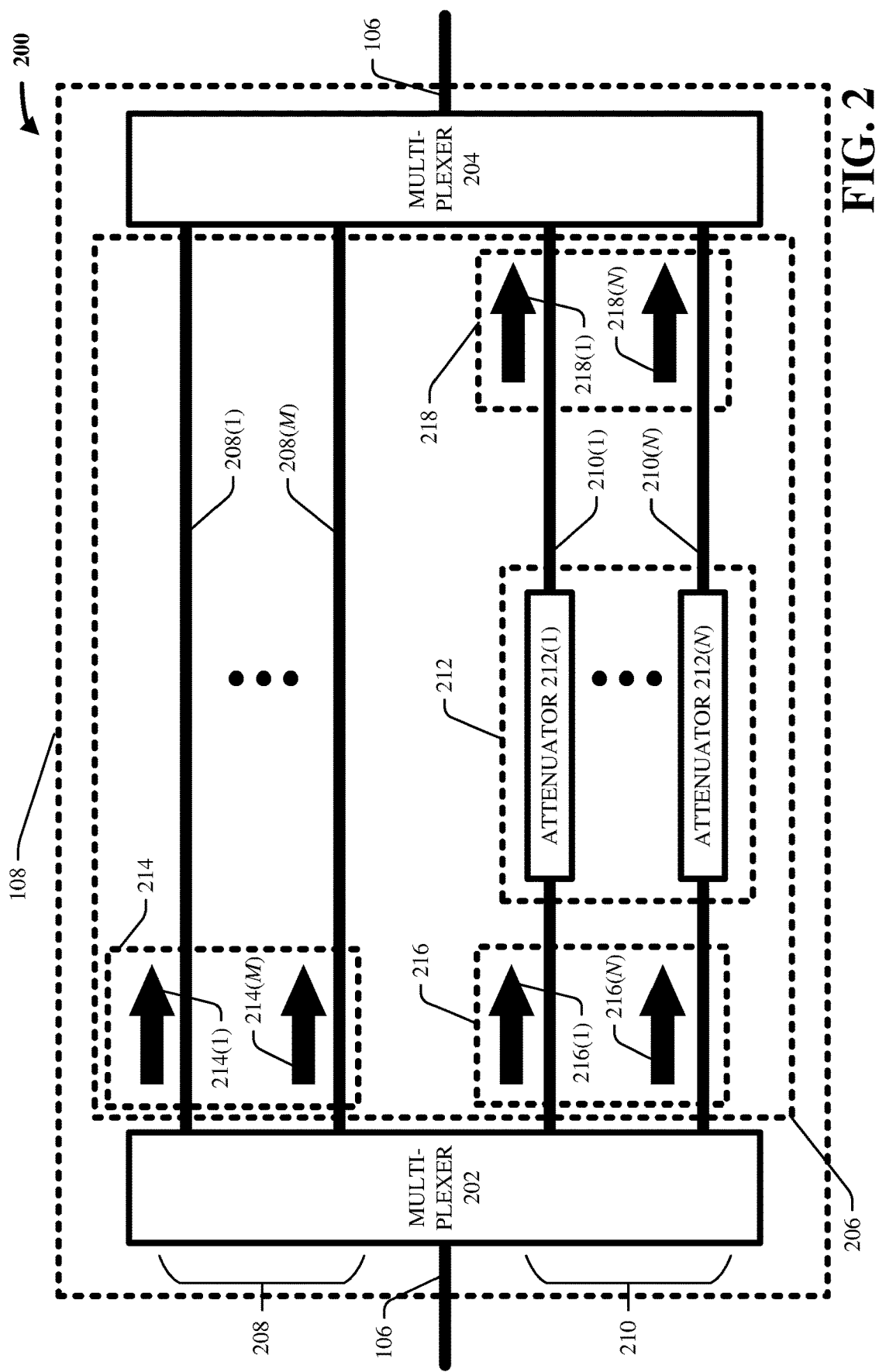
FIG. 2 illustrates a block diagram of an example, non-limiting dual-multiplexer circuit in accordance with one or more embodiments described herein.
Figure 3:
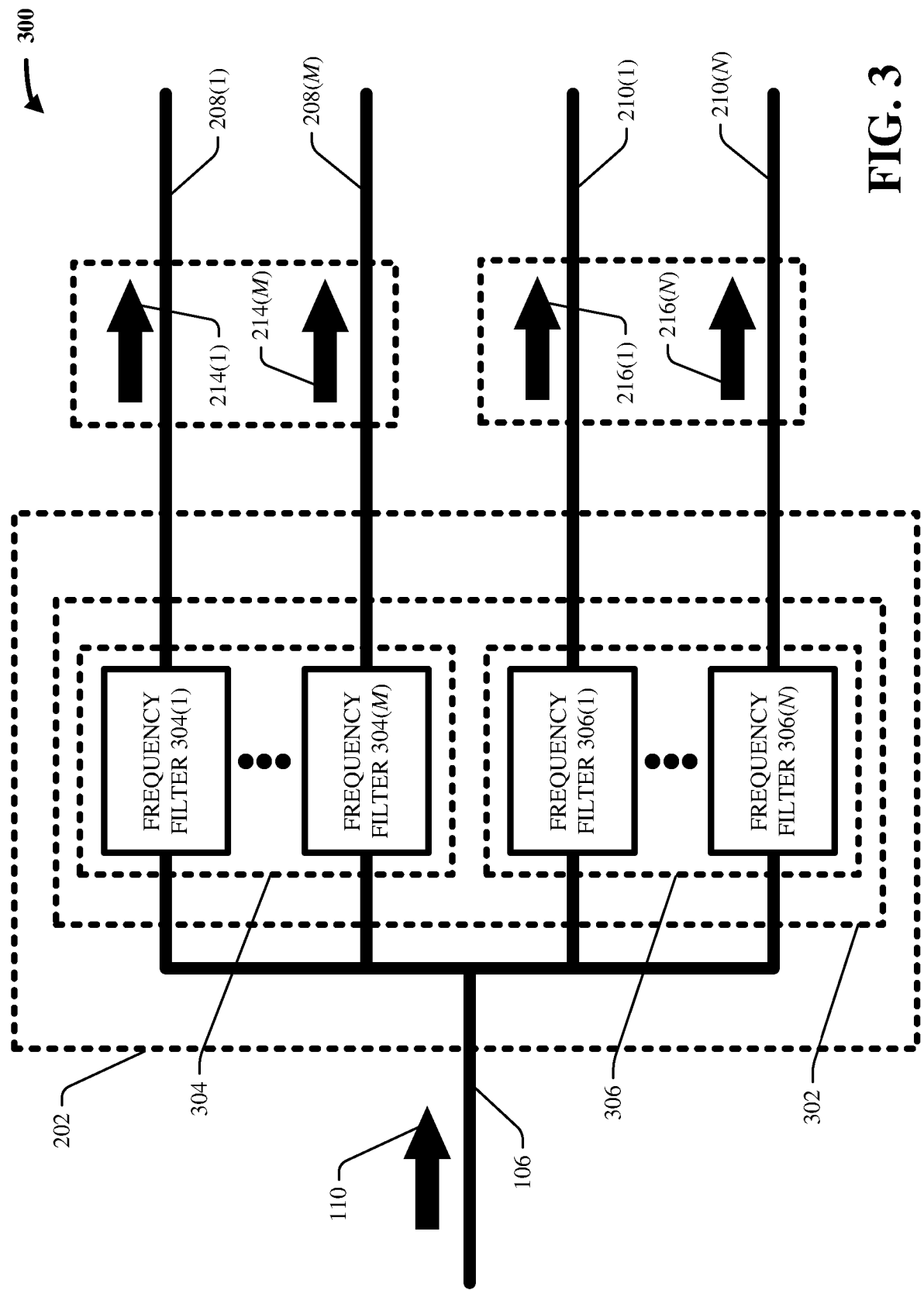
FIG. 3 illustrates a block diagram of an example, non-limiting first multiplexer of a dual-multiplexer circuit in accordance with one or more embodiments described herein.
Figure 4:
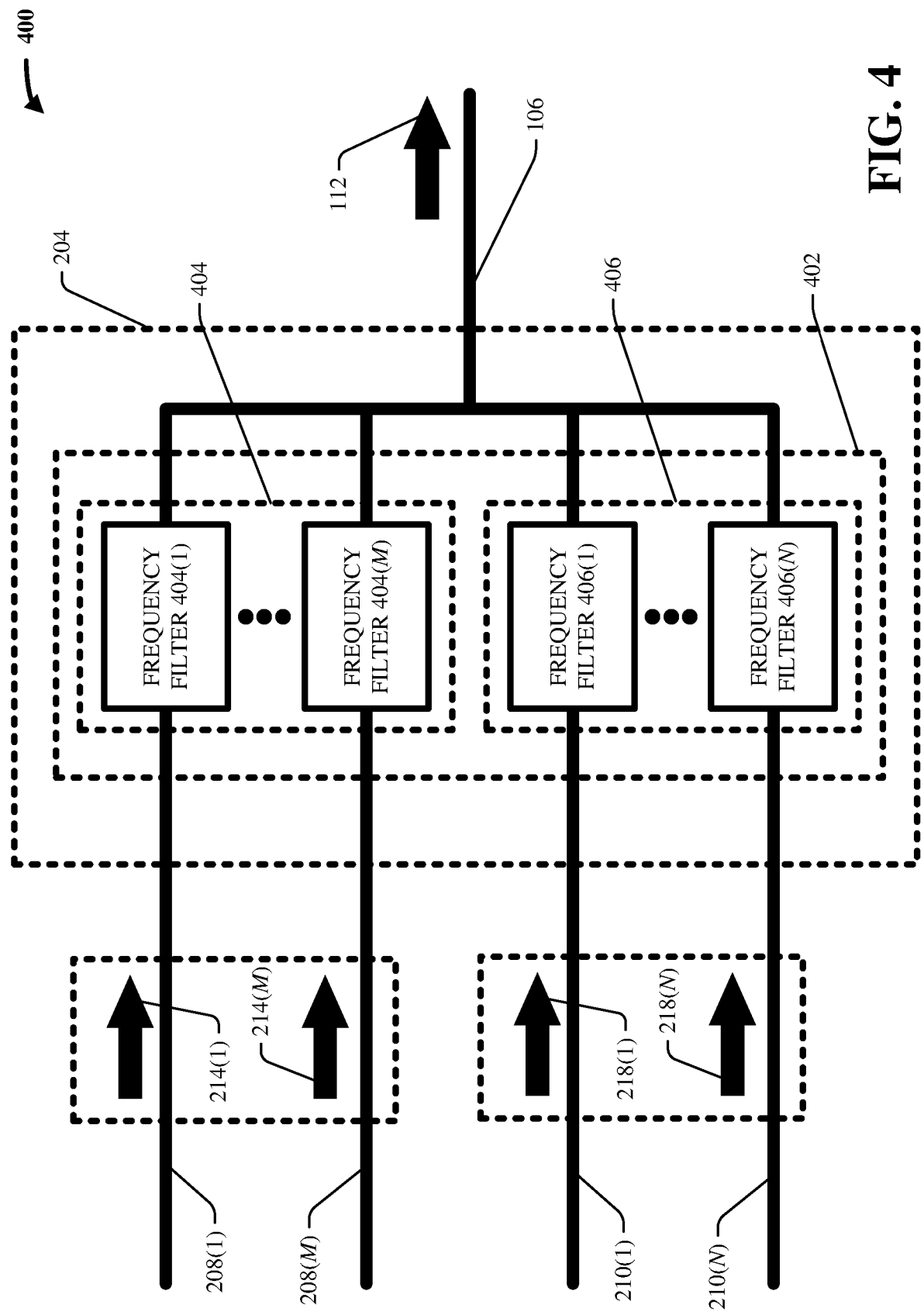
FIG. 4 illustrates a block diagram of an example, non-limiting second multiplexer of a dual-multiplexer circuit in accordance with one or more embodiments described herein.

FIGS. 2-4 and associated text more fully describe various structural details of the dual-multiplexer circuit 108.

FIG. 2 illustrates a block diagram 200 of an example, non-limiting dual-multiplexer circuit in accordance with one or more embodiments described herein. In other words, FIG. 2 depicts a non-limiting example embodiment of the dual-multiplexer circuit 108.

In various embodiments, as shown, the dual-multiplexer circuit 108 can include a multiplexer 202 and/or a multiplexer 204. In various aspects, the multiplexer 202 can be any suitable electric circuit for splitting a frequency-multiplexed signal into any suitable number of constituent signals that have disjoint frequencies. Conversely, in various instances, the multiplexer 204 can be any suitable electric circuit for combining constituent signals that have disjoint frequencies into a frequency-multiplexed signal. In some cases, the multiplexer 204 can mirror the multiplexer 202. That is, the multiplexer 204 can have a circuit structure (e.g., composed of any suitable resistors, capacitors, inductors) that physically mirrors and/or that is physically symmetric to that of the multiplexer 202. Note that the dual-multiplexer circuit 108 can be referred to as "dual-multiplexer" due to the inclusion of two multiplexers (e.g., 202 and 204).

In various aspects, as shown, the dual-multiplexer circuit 108 can further include a set of wires 206 that collectively couple the multiplexer 202 to the multiplexer 204. In various instances, each of the set of wires 206 can be made up of any suitable superconducting materials (e.g., different ones of the set of wires 206 can be made up of the same and/or different superconducting materials as each other). Moreover, in various cases, each of the set of wires 206 can exhibit any suitable sizes, shapes, and/or dimensions (e.g., different ones of the set of wires 206 can be exhibit the same and/or different sizes as each other, the same and/or different shapes as each other, and/or the same and/or different dimensions as each other). In various aspects, as shown, the set of wires 206 can be considered as being made up of a subset of wires 208 and a subset of wires 210. In various instances, the subset of wires 208 can include m wires for any suitable positive integer m: a wire 208(1) to a wire 208(m). Similarly, as shown, the subset of wires 210 can include n wires for any suitable positive integer n: a wire 210(1) to a wire 210(n). Accordingly, because the subset of wires 208 can include m wires, and because the subset of wires 210 can include n wires, the set of wires 206 can include a total of m+n wires. Let p=m+n. In such case, the multiplexer 202 can be considered as a p-plexer that can split a frequency-multiplexed signal into p constituent signals having p disjoint frequencies. Similarly, in such case, the multiplexer 204 can be considered as a p-plexer that can combine p constituent signals having p disjoint frequencies into a single frequency-multiplexed signal.

In various aspects, as shown, the subset of wires 208 can lack and/or otherwise be devoid of attenuators. In contrast, however, the subset of wires 210 can be respectively outfitted with a set of attenuators 212. As a non-limiting example, because the subset of wires 210 can include n wires, the set of attenuators 212 can include n attenuators (e.g., one attenuator per wire): an attenuator 212(1) to an attenuator 212(n). More specifically, the attenuator 212(1) can be located and/or fabricated on and/or along the wire 210(1), and the attenuator 212(n) can be located and/or fabricated on and/or along the wire 210(n). In various instances, each of the set of attenuators 212 can exhibit any suitable attenuator structure/architecture. As a non-limiting example, an attenuator can exhibit a nickel-chrome attenuator structure. As another non-limiting example, an attenuator can exhibit a directional-coupler (e.g., a broadside-coupled) attenuator structure. In any case, different ones of the set of attenuators 212 can have the same and/or different structures/compositions as each other. Although FIG. 1 depicts each of the subset of wires 210 as being outfitted with one respectively corresponding attenuator from the set of attenuators 212, this is a mere non-limiting example for ease of illustration. In various cases, any wire of the subset of wires 210 can be outfitted with two or more attenuators having any suitable structures/compositions as desired. Furthermore, in various aspects, different ones of the subset of wires 210 can be outfitted with the same and/or different numbers, structures, and/or types of the attenuators as each other.

In various aspects, as mentioned above, the input signal 110, as created by the signal generator 102, can be a frequency-multiplexed signal. In particular, the input signal 110 can, in various instances, be made up of a set of qubit control signals 214 and a set of qubit readout signals 216, each of which can have different frequencies than each other. In various cases, the set of qubit control signals 214 can include m control signals each having a unique frequency: a qubit control signal 214(1) to a qubit control signal 214(m). That is, the qubit control signal 214(1) can have a first frequency, can have any suitable amplitude and/or phase, and can encode/represent one or more quantum gates that are desired to be executed on/by the qubit 104 (and/or on/by a neighbor of the qubit 104). Similarly, the qubit control signal 214(m) can have an m-th unique frequency, can have any suitable amplitude and/or phase, and can encode/represent any suitable quantum gates that are desired to be executed on/by the qubit 104 (and/or on/by a neighbor of the qubit 104). In various aspects, the set of qubit readout signals 216 can include n readout signals each having a unique frequency: a qubit readout signal 216(1) to a qubit readout signal 216(n). That is, the qubit readout signal 216(1) can have an (m+1)-th unique frequency, can have any suitable amplitude and/or phase, and can encode/represent a measurement query that is directed to a readout resonator coupled to the qubit 104 (and/or coupled to a neighbor of the qubit 104). Likewise, the qubit readout signal 216(n) can have an (m+n)-th unique frequency, can have any suitable amplitude and/or phase, and can encode/represent a measurement query that is directed to a readout resonator coupled to the qubit 104 (and/or coupled to a neighbor of the qubit 104). In other words, the frequencies of the set of qubit control signals 214 can be disjoint with each other, the frequencies of the set of qubit readout signals 216 can be disjoint with each other, and/or the frequencies of the set of qubit control signal 214 can be disjoint with the frequencies of the set of qubit readout signals 216.

In any case, the cable 106 can transmit the input signal 110 to the multiplexer 202, and the multiplexer 202 can frequency-split (e.g., via any suitable frequency filters, as described further herein) the input signal 110 into the set of qubit control signals 214 and the set of qubit readout signals 216. In various aspects, as shown, the multiplexer 202 can direct the set of qubit control signals 214 along respective ones of the subset of wires 208. For instance, the multiplexer 202 can direct the qubit control signal 214(1) along the wire 208(1), and/or the multiplexer 202 can direct the qubit control signal 214(m) along the wire 208(m). Similarly, in various cases, the multiplexer 202 can direct the set of qubit readout signals 216 along respective ones of the subset of wires 210. For example, the multiplexer 202 can direct the qubit readout signal 216(1) along the wire 210(1), and/or the multiplexer 202 can direct the qubit readout signal 216(n) along the wire 210(n).

Because the subset of wires 208 can lack and/or be devoid of attenuators, the subset of wires 208 can respectively transmit the set of qubit control signals 214 from the multiplexer 202 to the multiplexer 204 without application of any attenuation (and/or with application of at most negligible attenuation). For example, the qubit control signal 214(1) can travel and/or propagate along the wire 208(1) from the multiplexer 202 to the multiplexer 204, while experiencing no and/or negligible attenuation. Similarly, the qubit control signal 214(m) can travel and/or propagate along the wire 208(m) from the multiplexer 202 to the multiplexer 204, while experiencing no and/or negligible attenuation. In contrast, the subset of wires 210 can be respectively equipped with the set of attenuators 212. Accordingly, the subset of wires 210 can respectively transmit the set of qubit readout signals 216 to the set of attenuators 212. In various aspects, the set of attenuators 212 can respectively attenuate and/or otherwise diminish the amplitudes of the set of qubit readout signals 216.

For example, the qubit readout signal 216(1) can travel/propagate along the wire 210(1) from the multiplexer 202 to the attenuator 212(1). In various cases, the amplitude of the qubit readout signal 216(1) can become attenuated and/or diminished as the qubit readout signal 216(1) passes through the attenuator 212(1). Thus, the result of the qubit readout signal 216(1) passing through the attenuator 212(1) can be an attenuated qubit readout signal 218(1). In other words, the attenuated qubit readout signal 218(1) can be considered as an amplitude-reduced version of the qubit readout signal 216(1) that is created by the attenuator 212(1). In still other words, the attenuated qubit readout signal 218(1) can have the same frequency, phase, and/or duration as the qubit readout signal 216(1) (e.g., meaning that the attenuated qubit readout signal 218(1) can represent/encode the same measurement query to the same readout resonator as the qubit readout signal 216(1)), but the attenuated qubit readout signal 218(1) can have a smaller amplitude than the qubit readout signal 216(1). As those having ordinary skill in the art will appreciate, the amount and/or scale of such amplitude attenuation can depend upon the size, type, and/or composition of the attenuator 212(1).

As another example, the qubit readout signal 216(n) can travel/propagate along the wire 210(n) from the multiplexer 202 to the attenuator 212(n). In various aspects, the amplitude of the qubit readout signal 216(n) can become attenuated and/or diminished as the qubit readout signal 216(n) passes through the attenuator 212(n). So, the result of the qubit readout signal 216(n) passing through the attenuator 212(n) can be an attenuated qubit readout signal 218(n). In other words, the attenuated qubit readout signal 218(n) can be considered as an amplitude-reduced version of the qubit readout signal 216(n) that is created by the attenuator 212(n). In still other words, the attenuated qubit readout signal 218(n) can have the same frequency, phase, and/or duration as the qubit readout signal 216(n) (e.g., meaning that the attenuated qubit readout signal 218(n) can represent/encode the same measurement query to the same readout resonator as the qubit readout signal 216(n)), but the attenuated qubit readout signal 218(n) can have a smaller amplitude than the qubit readout signal 216(n). As those having ordinary skill in the art will appreciate, the amount and/or scale of such amplitude attenuation can depend upon the size, type, and/or composition of the attenuator 212(n).

In various aspects, the attenuated qubit readout signal 218(1) to the attenuated qubit readout signal 218(n) can be collectively considered as a set of attenuated qubit readout signals 218 that respectively correspond to the set of qubit readout signals 216. That is, the subset of wires 210 can transmit the set of qubit readout signals 216 from the multiplexer 202 to the set of attenuators 212, and the set of attenuators 212 can respectively transform/convert the set of qubit readout signals 216 into the set of attenuated qubit readout signals 218.

In any case, the subset of wires 208 can transmit the set of qubit control signals 214 from the multiplexer 202 to the multiplexer 204, and the subset of wires 210 can transmit the set of attenuated qubit readout signals 218 from the set of attenuators 212 to the multiplexer 204. In various aspects, the multiplexer 204 can frequency-combine (e.g., via any suitable frequency filters that mirror those of the multiplexer 202, as described further herein) the set of qubit control signals 214 with the set of attenuated qubit readout signals 218. In various instances, the result of such frequency-combination can be the modified input signal 112. That is, the multiplexer 204 can merge together the set of qubit control signals 214 and the set of attenuated qubit readout signals 218, thereby yielding the modified input signal 112. Accordingly, the cable 106 can transmit the modified input signal 112 to the qubit 104.

Further details of the multiplexer 202 are described with respect to FIG. 3, and further details of the multiplexer 204 are described with respect to FIG. 4.

FIG. 3 illustrates a block diagram 300 of an example, non-limiting first multiplexer of a dual-multiplexer circuit in accordance with one or more embodiments described herein. That is, FIG. 3 depicts an example, non-limiting embodiment of the multiplexer 202.

In various embodiments, as shown, the cable 106 can be routed into the multiplexer 202, the cable 106 can be forked into the set of wires 206 (e.g., can be forked into the subset of wires 208 and the subset of wires 210) within the multiplexer 202, and the set of wires 206 (e.g., the subset of wires 208 and the subset of wires 210) can be routed out of the multiplexer 202. In various aspects, as further shown, the multiplexer 202 can include a set of frequency filters 302 that are respectively installed on the set of wires 206. More specifically, the set of frequency filters 302 can be made up of a subset of frequency filters 304 and a subset of frequency filters 306, where the subset of frequency filters 304 can be respectively installed on the subset of wires 208, and/or where the subset of frequency filters 306 can be respectively installed on the subset of wires 210. Because the subset of wires 208 can include m wires, the subset of frequency filters 304 can include m filters (e.g., one filter per wire): a frequency filter 304(1) to a frequency filter 304(m). That is, the frequency filter 304(1) can be located and/or otherwise fabricated on/along the wire 208(1), and the frequency filter 304(m) can be located and/or otherwise fabricated on/along the wire 208(m). Likewise, because the subset of wires 210 can include n wires, the subset of frequency filters 306 can include n filters (e.g., one filter per wire): a frequency filter 306(1) to a frequency filter 306(n). That is, the frequency filter 306(1) can be located and/or otherwise fabricated on/along the wire 210(1), and the frequency filter 306(n) can be located and/or otherwise fabricated on/along the wire 210(n).

Although FIG. 3 depicts each of the set of wires 206 as being outfitted/equipped with one respectively corresponding filter from the set of frequency filters 302, this is a mere non-limiting example for ease of illustration. In various cases, any wire of the set of wires 210 can be outfitted with two or more frequency filters of the set of frequency filters 302 having any suitable characteristics as desired. Furthermore, in various aspects, different ones of the set of wires 206 can be outfitted/equipped with the same and/or different numbers of frequency filters as each other.

In various aspects, each of the set of frequency filters 302 can exhibit any suitable frequency filtration circuit structure/architecture as desired. As a non-limiting example, a frequency filter can be an active, passive, and/or reactive low-pass filter being composed of any suitable arrangement of any suitable number of resistors having any suitable resistance values, any suitable number of capacitors having any suitable capacitance values, and/or any suitable number of inductors having any suitable inductance values. As another non-limiting example, a frequency filter can be an active, passive, and/or reactive high-pass filter being composed of any suitable arrangement of any suitable number of resistors having any suitable resistance values, any suitable number of capacitors having any suitable capacitance values, and/or any suitable number of inductors having any suitable inductance values. As yet another example, a frequency filter can be an active, passive, and/or reactive band-pass filter being composed of any suitable sequence/combination of high-pass filters and/or low-pass filters.

In any case, each of the set of frequency filters 302 can have a unique pass-band (e.g., a unique range of frequencies which it allows to pass) and/or a unique stop-band (e.g., a unique range of frequencies which it prevents from passing). Indeed, in various aspects, the pass-bands of the set of frequency filters 302 can all be disjoint with each other. For example, the frequency filter 304(1) can have a pass-band that is disjoint and/or non-overlapping with the pass-bands of each remaining filter in the subset of frequency filters 304 and/or that is also disjoint/non-overlapping with the pass-bands of each of the subset of frequency filters 306. Stated differently, the frequency filter 304(1) can pass a range of frequencies which would be stopped by each remaining filter in the subset of frequency filters 304 and/or by each of the subset of frequency filters 306. As another example, the frequency filter 304(m) can have a pass-band that is disjoint/non-overlapping with the pass-bands of each remaining filter in the subset of frequency filters 304 and/or that is also disjoint/non-overlapping with the pass-bands of each of the subset of frequency filters 306. As above, this can mean that the frequency filter 304(m) can pass a range of frequencies which would be stopped by each remaining filter in the subset of frequency filters 304 and/or by each of the subset of frequency filters 306. As yet another example, the frequency filter 306(1) can have a pass-band that is disjoint/non-overlapping with the pass-bands of each remaining filter in the subset of frequency filters 306 and/or that is also disjoint/non-overlapping with the pass-bands of each of the subset of frequency filters 304. Again, this can mean that the frequency filter 306(1) can pass a range of frequencies which would be stopped by each remaining filter in the subset of frequency filters 306 and/or by each of the subset of frequency filters 304. As still another example, the frequency filter 306(n) can have a pass-band that is disjoint/non-overlapping with the pass-bands of each remaining filter in the subset of frequency filters 306 and/or that is also disjoint/non-overlapping with the pass-bands of each of the subset of frequency filters 304. Once more, this can mean that the frequency filter 306(n) can pass a range of frequencies which would be stopped by each remaining filter in the subset of frequency filters 306 and/or by each of the subset of frequency filters 304.

In any case, the frequencies of the set of qubit control signals 214 can respectively be within the pass-bands of the subset of frequency filters 304, and/or the frequencies of the set of qubit readout signals 216 can respectively be within the pass-bands of the subset of frequency filters 306. Accordingly, the input signal 110 can be received by each of the subset of frequency filters 304 and by each of the subset of frequency filters 306, and the subset of frequency filters 304 and the subset of frequency filters 306 can respectively decompose and/or split the input signal 110 into the subset of qubit control signals 214 and the subset of qubit readout signals 216.

For example, as shown, the input signal 110 can be received by the frequency filter 304(1). In various aspects, it can be the case that the frequency of the qubit control signal 214(1) is within the pass-band of the frequency filter 304(1), and it can further be the case that the frequencies of the remainder of the set of qubit control signals 214 and/or the frequencies of the set of qubit readout signals 216 are within the stop-band of the frequency filter 304(1). In such case, the frequency filter 304(1) can allow the qubit control signal 214(1) to pass onto the wire 208(1) and can stop/prevent the remainder of the set of qubit control signals 214 and/or the set of qubit readout signals 216 from passing onto the wire 208(1).

As another example, as shown, the input signal 110 can be received by the frequency filter 304(m). In various aspects, it can be the case that the frequency of the qubit control signal 214(m) is within the pass-band of the frequency filter 304(m), and it can further be the case that the frequencies of the remainder of the set of qubit control signals 214 and/or the frequencies of the set of qubit readout signals 216 are within the stop-band of the frequency filter 304(m). In such case, the frequency filter 304(m) can allow the qubit control signal 214(m) to pass onto the wire 208(m) and can stop/prevent the remainder of the set of qubit control signals 214 and/or the set of qubit readout signals 216 from passing onto the wire 208(m).

As still another example, as shown, the input signal 110 can be received by the frequency filter 306(1). In various aspects, it can be the case that the frequency of the qubit readout signal 216(1) is within the pass-band of the frequency filter 306(1), and it can further be the case that the frequencies of the remainder of the set of qubit readout signals 216 and/or the frequencies of the set of qubit control signals 214 are within the stop-band of the frequency filter 306(1). In such case, the frequency filter 306(1) can allow the qubit readout signal 216(1) to pass onto the wire 210(1) and can stop/prevent the remainder of the set of qubit readout signals 216 and/or the set of qubit control signals 214 from passing onto the wire 210(1).

As even another example, as shown, the input signal 110 can be received by the frequency filter 306(n). In various aspects, it can be the case that the frequency of the qubit readout signal 216(n) is within the pass-band of the frequency filter 306(n), and it can further be the case that the frequencies of the remainder of the set of qubit readout signals 216 and/or the frequencies of the set of qubit control signals 214 are within the stop-band of the frequency filter 306(n). In such case, the frequency filter 306(n) can allow the qubit readout signal 216(n) to pass onto the wire 210(n) and can stop/prevent the remainder of the set of qubit readout signals 216 and/or the set of qubit control signals 214 from passing onto the wire 210(n).

In this way, the multiplexer 202 can leverage the set of frequency filters 302 to split the input signal 110 into the set of qubit control signals 214 and the set of qubit readout signals 216.

FIG. 4 illustrates a block diagram 400 of an example, non-limiting second multiplexer of a dual-multiplexer circuit in accordance with one or more embodiments described herein. That is, FIG. 4 depicts an example, non-limiting embodiment of the multiplexer 204.

In various embodiments, as shown, the set of wires 206 (e.g., the subset of wires 208 and the subset of wires 210) can be routed into the multiplexer 204, the set of wires 206 (e.g., the subset of wires 208 and the subset of wires 210) can be merged back into the cable 106 within the multiplexer 204, and the cable 106 can be routed out of the multiplexer 204. In various aspects, as further shown, the multiplexer 204 can include a set of frequency filters 402 that are respectively installed on the set of wires 206. More specifically, the set of frequency filters 402 can be made up of a subset of frequency filters 404 and a subset of frequency filters 406, where the subset of frequency filters 404 can be respectively installed on the subset of wires 208, and/or where the subset of frequency filters 406 can be respectively installed on the subset of wires 210. Because the subset of wires 208 can include m wires, the subset of frequency filters 404 can include m filters (e.g., one filter per wire): a frequency filter 404(1) to a frequency filter 404(m). That is, the frequency filter 404(1) can be located and/or otherwise fabricated on/along the wire 208(1), and the frequency filter 404(m) can be located and/or otherwise fabricated on/along the wire 208(m). Likewise, because the subset of wires 210 can include n wires, the subset of frequency filters 406 can include n filters (e.g., one filter per wire): a frequency filter 406(1) to a frequency filter 406(n). That is, the frequency filter 406(1) can be located and/or otherwise fabricated on/along the wire 210(1), and the frequency filter 406(n) can be located and/or otherwise fabricated on/along the wire 210(n).

Accordingly, the set of wires 206 can, in some cases, be considered as being respectively capped at one end by the set of frequency filters 302 and can further be considered as being respectively capped at another end by the set of frequency filters 402. As an example, the wire 208(1) can be considered as being capped on an upstream end by the frequency filter 304(1) and as being capped on a downstream end by the frequency filter 404(1). As another example, the wire 208(m) can be considered as being capped on an upstream end by the frequency filter 304(m) and as being capped on a downstream end by the frequency filter 404(m). As still another example, the wire 210(1) can be considered as being capped on an upstream end by the frequency filter 306(1) and as being capped on a downstream end by the frequency filter 406(1). As yet another example, the wire 210(n) can be considered as being capped on an upstream end by the frequency filter 306(n) and as being capped on a downstream end by the frequency filter 406(n).

As above, although FIG. 4 depicts each of the set of wires 206 as being outfitted/equipped with one respectively corresponding filter from the set of frequency filters 402, this is a mere non-limiting example for ease of illustration. In various cases, any wire of the set of wires 210 can be outfitted with two or more frequency filters of the set of frequency filters 402 having any suitable characteristics as desired. Furthermore, in various aspects, different ones of the set of wires 206 can be outfitted/equipped with the same and/or different numbers of frequency filters as each other.

In various aspects, each of the set of frequency filters 402 can exhibit any suitable frequency filtration circuit structure/architecture as desired (e.g., can be an active, passive, and/or reactive low-pass filter being composed of any suitable arrangement of any suitable number of resistors, capacitors, and/or inductors; can be an active, passive, and/or reactive high-pass filter being composed of any suitable arrangement of any suitable number of resistors, capacitors, and/or inductors; and/or can be an active, passive, and/or reactive band-pass filter being composed of any suitable sequence/combination of high-pass filters and/or low-pass filters). In some instances, the set of frequency filters 402 can respectively mirror the set of frequency filters 302. That is, the subset of frequency filters 404 can respectively mirror the subset of frequency filters 304, and/or the subset of frequency filters 406 can respectively mirror the subset of frequency filters 306.

For example, the frequency filter 404(1) can have a same, mirroring, and/or symmetric circuit structure (e.g., same, mirroring, and/or symmetric arrangement of resistors, inductors, and/or capacitors) as the frequency filter 304(1). Accordingly, the frequency filter 404(1) can have the same pass-band and/or the same stop-band as the frequency filter 304(1). Therefore, the qubit control signal 214(1) can be within the pass-band of the frequency filter 404(1), and the frequencies of the remainder of the set of qubit control signals 214 can be within the stop-band of the frequency filter 404(1). Moreover, since the frequencies of the set of attenuated qubit readout signals 218 can be the same as the frequencies of the set of qubit readout signals 216, the frequencies of the set of attenuated qubit readout signals 218 can be within the stop-band of the frequency filter 404(1).

As another example, the frequency filter 404(m) can have a same, mirroring, and/or symmetric circuit structure (e.g., same, mirroring, and/or symmetric arrangement of resistors, inductors, and/or capacitors) as the frequency filter 304(m). So, the frequency filter 404(m) can have the same pass-band and/or the same stop-band as the frequency filter 304(m). Therefore, the qubit control signal 214(m) can be within the pass-band of the frequency filter 404(m), and the frequencies of the remainder of the set of qubit control signals 214 can be within the stop-band of the frequency filter 404(m). Further, since the frequencies of the set of attenuated qubit readout signals 218 can be the same as the frequencies of the set of qubit readout signals 216, the frequencies of the set of attenuated qubit readout signals 218 can be within the stop-band of the frequency filter 404(m).

As still another example, the frequency filter 406(1) can have a same, mirroring, and/or symmetric circuit structure (e.g., same, mirroring, and/or symmetric arrangement of resistors, inductors, and/or capacitors) as the frequency filter 306(1). Thus, the frequency filter 406(1) can have the same pass-band and/or the same stop-band as the frequency filter 306(1). Therefore, since the frequencies of the set of attenuated qubit readout signals 218 can be the same as the frequencies of the set of qubit readout signals 216, the attenuated qubit readout signal 218(1) can be within the pass-band of the frequency filter 406(1), and the frequencies of the remainder of the set of attenuated qubit readout signals 218 and the frequencies of the set of qubit control signals 214 can be within the stop-band of the frequency filter 406(1).

As even another example, the frequency filter 406($n$) can have a same, mirroring, and/or symmetric circuit structure (e.g., same, mirroring, and/or symmetric arrangement of resistors, inductors, and/or capacitors) as the frequency filter 306($n$). Accordingly, the frequency filter 406($n$) can have the same pass-band and/or the same stop-band as the frequency filter 306($n$). Therefore, since the frequencies of the set of attenuated qubit readout signals 218 can be the same as the frequencies of the set of qubit readout signals 216, the attenuated qubit readout signal 218($n$) can be within the pass-band of the frequency filter 406($n$), and the frequencies of the remainder of the set of attenuated qubit readout signals 218 and the frequencies of the set of qubit control signals 214 can be within the stop-band of the frequency filter 406($n$).

In various aspects, as shown, the set of qubit control signals 214 can respectively pass through the subset of frequency filters 404, and the set of attenuated qubit readout signals 218 can respectively pass through the subset of frequency filters 406. After respectively passing through the set of frequency filters 402, the set of qubit control signals 214 and the set of attenuated qubit readout signals 218 can be merged together within the multiplexer 204 onto a single cable (e.g., the cable 106). In various instances, the result of such merging can be the modified input signal 112.

In this way, the multiplexer 204 can leverage the set of frequency filters 402 to combine the set of qubit control signals 214 and the set of attenuated qubit readout signals 218, thereby resulting in the modified input signal 112.

Accordingly, by implementing the multiplexer 202 comprising the set of frequency filters 302, the multiplexer 204 comprising the set of frequency filters 402, the set of wires 206, and/or the set of attenuators 212, the dual-multiplexer circuit 108 can selectively attenuate the set of qubit readout signals 216, without attenuating (e.g., while at most negligibly attenuating) the set of qubit control signals 214. Moreover, because the dual-multiplexer circuit 108 can be located within the cryostat (e.g., to the right of the cryostat demarcation 114), the dual-multiplexer circuit 108 can be considered as implementing cryogenic attenuation, which can result in less thermal noise as compared to existing techniques that utilize room temperature attenuation. Furthermore, because the dual-multiplexer circuit 108 can avoid attenuating the set of qubit control signals 214, there can be no need to have the signal generator 102 initially apply extreme amplification to the set of qubit control signals 214, which can be beneficial as compared to existing techniques that implement cryogenic attenuation. Further still, as experimentally verified by the present inventors, the dual-multiplexer circuit 108 can facilitate selective attenuation of the set of qubit readout signals 216 without experiencing excessive signal ripples, which can be beneficial as compared to existing techniques that utilize cryogenic low-pass filters.

Figure 5:
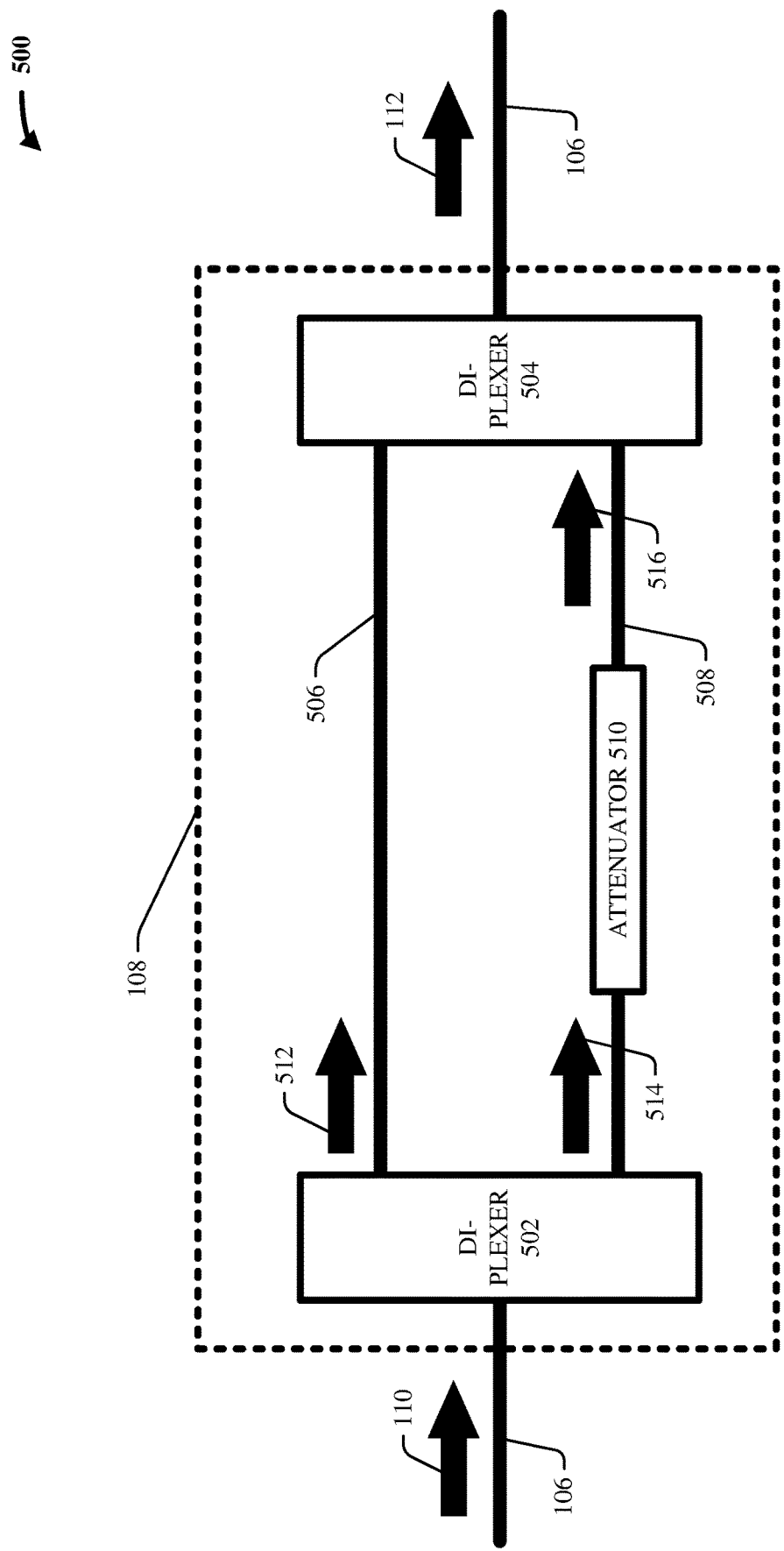
FIG. 5 illustrates a block diagram of an example, non-limiting dual-diplexer circuit in accordance with one or more embodiments described herein.

FIG. 5 illustrates a block diagram 500 of an example, non-limiting dual-diplexer circuit in accordance with one or more embodiments described herein. In other words, FIG. 5 illustrates an example, non-limiting embodiment of the dual-multiplexer circuit 108, where the multiplexer 202 and the multiplexer 204 are both diplexers.

In various embodiments, it can be the case that m=1 and n=1. That is, it can be the case that the input signal 110 is made up of one qubit control signal (e.g., since m=1) and one qubit readout signal (e.g., since n=1), it can be the case that the subset of wires 208 includes one wire (e.g., since m=1), and it can be the case that the subset of wires 210 includes one wire (e.g., since n=1). In such case, the multiplexer 202 can be considered as a diplexer (e.g., can be considered as splitting the input signal 110 into two constituent signals), and/or the multiplexer 204 can likewise be considered as a diplexer (e.g., can be considered as combining two constituent signals into the modified input signal 112). In such case, as shown in FIG. 5, the multiplexer 202 can instead be referred to as a diplexer 502, the multiplexer 204 can instead be referred to as a diplexer 504, the subset of wires 208 can instead be referred to as a wire 506, the subset of wires 210 can instead be referred to as a wire 508, the set of attenuators 212 can instead be referred to as an attenuator 510, the set of qubit control signals 214 can instead be referred to as a qubit control signal 512, the set of qubit readout signals 216 can instead be referred to as a qubit readout signal 514, and/or the set of attenuated qubit readout signals 218 can instead be referred to as an attenuated qubit readout signal 516.

In any case, the non-limiting, example embodiment of the dual-multiplexer circuit 108 that is shown in FIG. 5 can nevertheless function/operate as described above. For instance, the cable 106 can transmit the input signal 110 from the signal generator 102 to the diplexer 502. In various aspects, the diplexer 502 can frequency-split (e.g., using a pair of parallel frequency filters) the input signal 110 into the qubit control signal 512 and the qubit readout signal 514. In various instances, the wire 506 can transmit the qubit control signal 512 from the diplexer 502 to the diplexer 504. In various cases, the wire 508 can transmit the qubit readout signal 514 from the diplexer 502 to the attenuator 510. In various aspects, the attenuator 510 (which, in various cases, can be an ensemble of any suitable number and/or types of serial attenuators) can reduce the amplitude of the qubit readout signal 514, thereby yielding the attenuated qubit readout signal 516. In various instances, the wire 508 can then transmit the attenuated qubit readout signal 516 from the attenuator 510 to the diplexer 504. In various cases, the diplexer 504 can frequency-combine (e.g., via a pair of frequency filters that match/mirror the pair of filters implemented in the diplexer 502) the qubit control signal 512 with the attenuated qubit readout signal 516. In various cases, the result of such frequency-combination can be the modified input signal 112. Accordingly, as mentioned above, the cable 106 can transmit the modified input signal 112 to the qubit 104 and/or to any suitable readout resonator coupled to the qubit 104.

Figure 6:
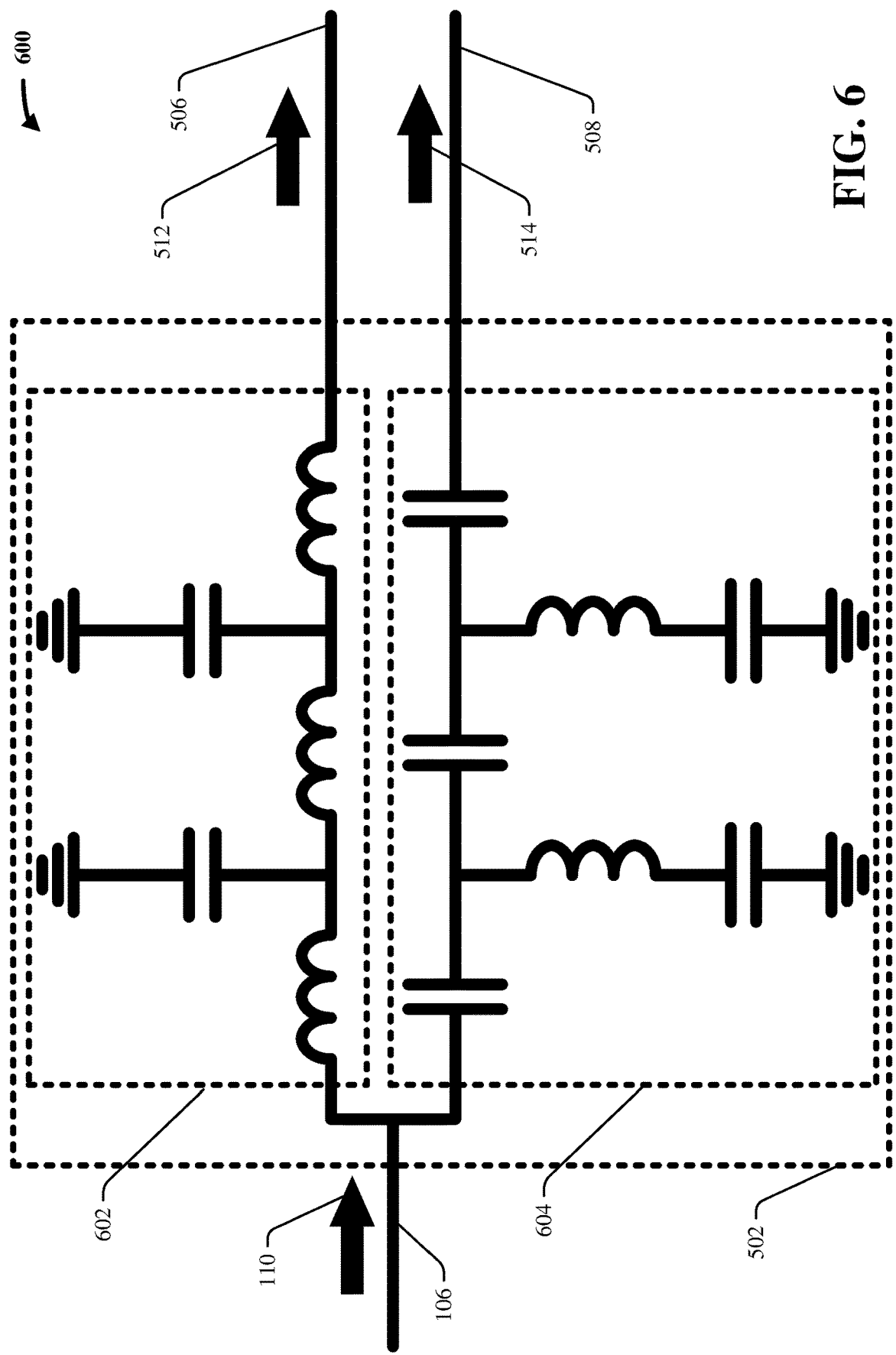
FIG. 6 illustrates a circuit diagram of an example, non-limiting first diplexer of a dual-diplexer circuit in accordance with one or more embodiments described herein.
Figure 7:
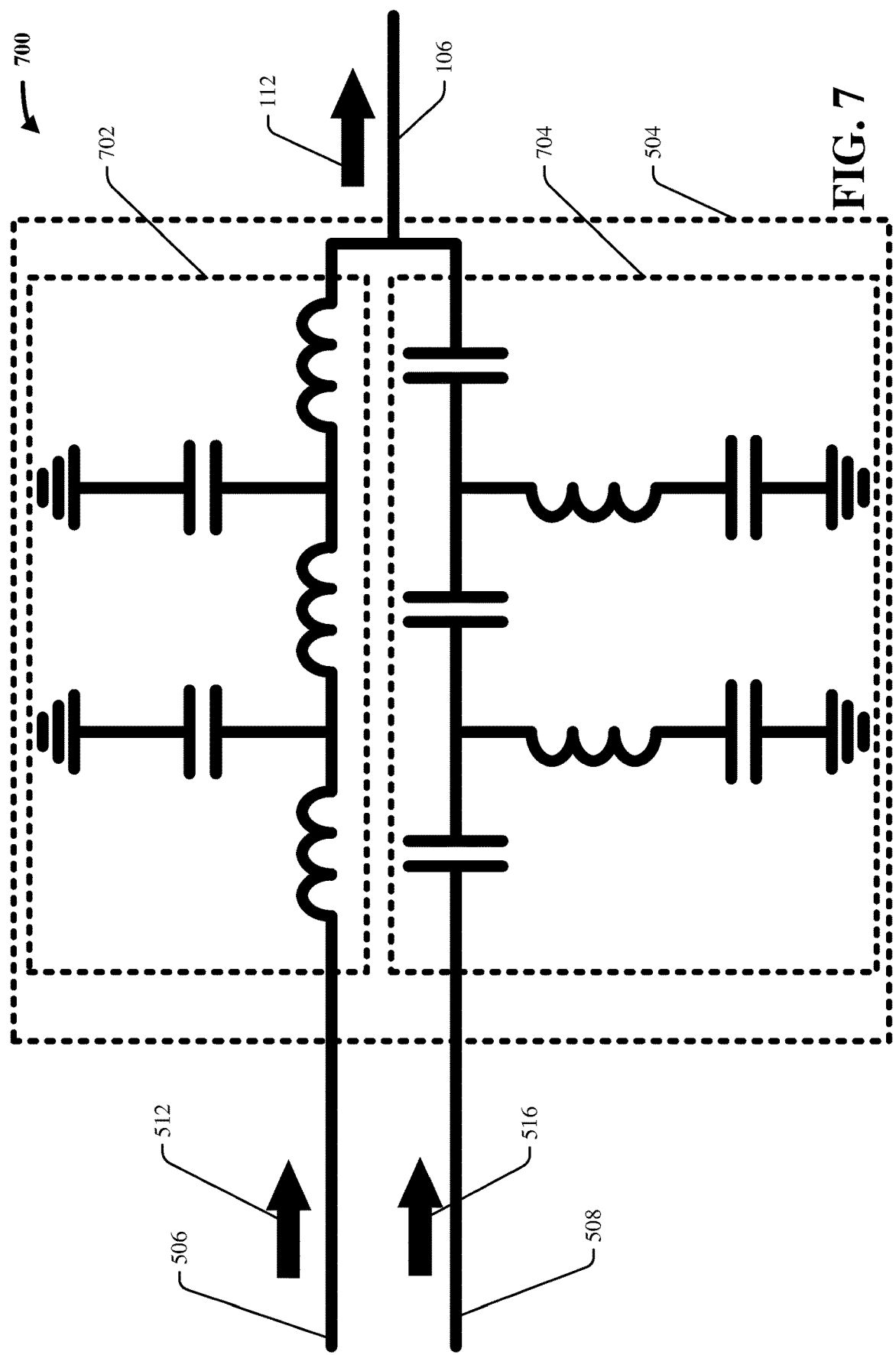
FIG. 7 illustrates a circuit diagram of an example, non-limiting second diplexer of a dual-diplexer circuit in accordance with one or more embodiments described herein.

Further details of the diplexer 502 are described with respect to FIG. 6, and further details of the diplexer 504 are described with respect to FIG. 7.

FIG. 6 illustrates a circuit diagram 600 of an example, non-limiting first diplexer of a dual-diplexer circuit in accordance with one or more embodiments described herein. That is, FIG. 6 depicts an example, non-limiting embodiment of the diplexer 502.

In various embodiments, as shown, the cable 106 can be routed into the diplexer 502, the cable 106 can be forked into the wire 506 and the wire 508 within the diplexer 502, and the wire 506 and the wire 508 can be routed out of the diplexer 502. In various aspects, as further shown, the diplexer 502 can include a pair of frequency filters that are respectively installed on the wire 506 and the wire 508. More specifically, the diplexer 502 can include a frequency filter 602 that is installed on the wire 506, and/or the diplexer 502 can further include a frequency filter 604 that is installed on the wire 508. In various aspects, the frequency filter 602 can exhibit any suitable frequency filtration architecture as desired. That is, the frequency filter 602 can be made up of any suitable arrangement of resistors, capacitors, and/or inductors that can collectively form a frequency pass-band and/or a frequency stop-band. As shown in the non-limiting example of FIG. 6, the frequency filter 602 can be a passive low-pass filter that is made up of three inductors and two grounded capacitors, where the pass-band and/or stop-band of the frequency filter 602 can depend upon the inductance values of such three inductors and/or on the capacitance values of such two grounded capacitors. In other words, the frequency filter 602 can be considered as an LC low-pass filter. Those having ordinary skill in the art will appreciate that the LC low-pass architecture of the frequency filter 602 that is shown in FIG. 6 is a mere non-limiting example for ease of illustration. Again, the frequency filter 602 can exhibit any other suitable filtration circuit structure/arrangement as desired.

Similarly, in various aspects, the frequency filter 604 can exhibit any suitable frequency filtration architecture. That is, the frequency filter 604 can be made up of any suitable arrangement of resistors, capacitors, and/or inductors that can collectively form a frequency pass-band and/or a frequency stop-band. As shown in the non-limiting example of FIG. 6, the frequency filter 604 can be a passive high-pass filter that is made up of two inductors and five capacitors, where the pass-band and/or stop-band of the frequency filter 604 can depend upon the inductance values of such two inductors and/or on the capacitance values of such five capacitors. In other words, the frequency filter 604 can be considered as an LC high-pass filter. Again, those having ordinary skill in the art will appreciate that the LC high-pass architecture of the frequency filter 604 that is shown in FIG. 6 is a mere non-limiting example for ease of illustration. Once more, the frequency filter 604 can exhibit any other suitable filtration circuit structure/arrangement as desired.

In any case, the frequency filter 602 and the frequency filter 604 can have disjoint and/or non-overlapping pass-bands. In other words, the frequency filter 602 can pass signals that would be stopped by the frequency filter 604, and/or the frequency filter 604 can pass signals that would be stopped by the frequency filter 602.

In various aspects, the qubit control signal 512 can have a frequency that is lower than the frequency of the qubit readout signal 514. In such case, the frequency of the qubit control signal 512 can be within the pass-band of the frequency filter 602 (e.g., which can be a low-pass filter, as mentioned above), and the frequency of the qubit control signal 512 can be within the stop-band of the frequency filter 604 (e.g., which can be a high-pass filter, as mentioned above). Conversely, in such case, the frequency of the qubit readout signal 514 can be within the stop-band of the frequency filter 602, and the frequency of the qubit readout signal 514 can be within the pass-band of the frequency filter 604. Accordingly, in various aspects, the cable 106 can transmit the input signal 110 to the frequency filter 602, and the frequency filter 602 can permit the qubit control signal 512 (which can be in its pass-band) to pass onto the wire 506 and/or can prevent the qubit readout signal 514 (which can be in its stop-band) from passing onto the wire 506. Similarly, the cable 106 can transmit the input signal 110 to the frequency filter 604, and the frequency filter 604 can permit the qubit readout signal 514 (which can be in its pass-band) to pass onto the wire 508 and/or can prevent the qubit control signal 512 (which can be in its stop-band) from passing onto the wire 508.

In this way, the diplexer 502 can leverage the frequency filter 602 and/or the frequency filter 604 to split the input signal 110 into the qubit control signal 512 and the qubit readout signal 514.

FIG. 7 illustrates a circuit diagram 700 of an example, non-limiting second diplexer of a dual-diplexer circuit in accordance with one or more embodiments described herein. That is, FIG. 7 depicts an example, non-limiting embodiment of the diplexer 504.

In various embodiments, as shown, the wire 506 and the wire 508 can be routed into the diplexer 504, the wire 506 and the wire 508 can be merged back into the cable 106 within the diplexer 504, and the cable 106 can be routed out of the diplexer 504. In various aspects, as further shown, the diplexer 504 can include a frequency filter 702 and/or a frequency filter 704 that are respectively installed on the wire 506 and the wire 508. More specifically, the frequency filter 702 can be installed on the wire 506, and/or the frequency filter 704 can be installed on the wire 508. In various aspects, the frequency filter 702 can exhibit any suitable frequency filtration circuit structure/architecture as desired. That is, the frequency filter 702 can be made up of any suitable arrangement of resistors, capacitors, and/or inductors that can collectively form a frequency pass-band and/or a frequency stop-band. As shown in the non-limiting example of FIG. 7, the frequency filter 702 can have the same and/or mirroring structure as the frequency filter 602. That is, the frequency filter 702 can be a passive low-pass filter made up of three inductors and two grounded capacitors having the same inductances and/or capacitances as the three inductors and two grounded capacitors of the frequency filter 602. Accordingly, the frequency filter 702 can have the same pass-band and/or the same stop-band as the frequency filter 602. Similarly, in various aspects, the frequency filter 704 can exhibit any suitable frequency filtration circuit structure/architecture as desired. In other words, the frequency filter 704 can be made up of any suitable arrangement of resistors, capacitors, and/or inductors that can collectively form a frequency pass-band and/or a frequency stop-band. As shown in the non-limiting example of FIG. 7, the frequency filter 704 can have the same and/or mirroring structure as the frequency filter 604. That is, the frequency filter 704 can be a passive high-pass filter made up of two inductors and five capacitors having the same inductances and/or capacitances as the two inductors and five capacitors of the frequency filter 604. Accordingly, the frequency filter 704 can have the same pass-band and/or the same stop-band as the frequency filter 604.

In various aspects, as shown, the qubit control signal 512 can pass through the frequency filter 702, and the attenuated qubit readout signal 516 can pass through the frequency filter 704. After respectively passing through such filters, the qubit control signal 512 and the attenuated qubit readout signal 516 can be merged together within the diplexer 504 onto a single cable (e.g., the cable 106). In various instances, the result of such merging can be the modified input signal 112.

In this way, the diplexer 504 can leverage the frequency filter 702 and/or the frequency filter 704 to combine the qubit control signal 512 and the attenuated qubit readout signal 516 into the modified input signal 112.

Just as explained above, the non-limiting, example embodiment of the dual-multiplexer circuit 108 that is depicted in FIGS. 5-7 can selectively attenuate the qubit readout signal 514 without attenuating (e.g., while at most negligibly attenuating) the qubit control signal 512. Furthermore, the non-limiting, example embodiment of the dual-multiplexer circuit 108 that is depicted in FIGS. 5-7 can facilitate such selective attenuation without excessive thermal noise (e.g., since no room temperature attenuation can be needed) and/or without excessive room temperature amplification (e.g., since the qubit control signal 512 can avoid becoming attenuated). Further still, the present inventors experimentally verified that the non-limiting, example embodiment of the dual-multiplexer circuit 108 that is depicted in FIGS. 5-7 can facilitate such selective attenuation without excessive ripple. Such experimental verification is discussed with respect to FIG. 8.

Figure 8:
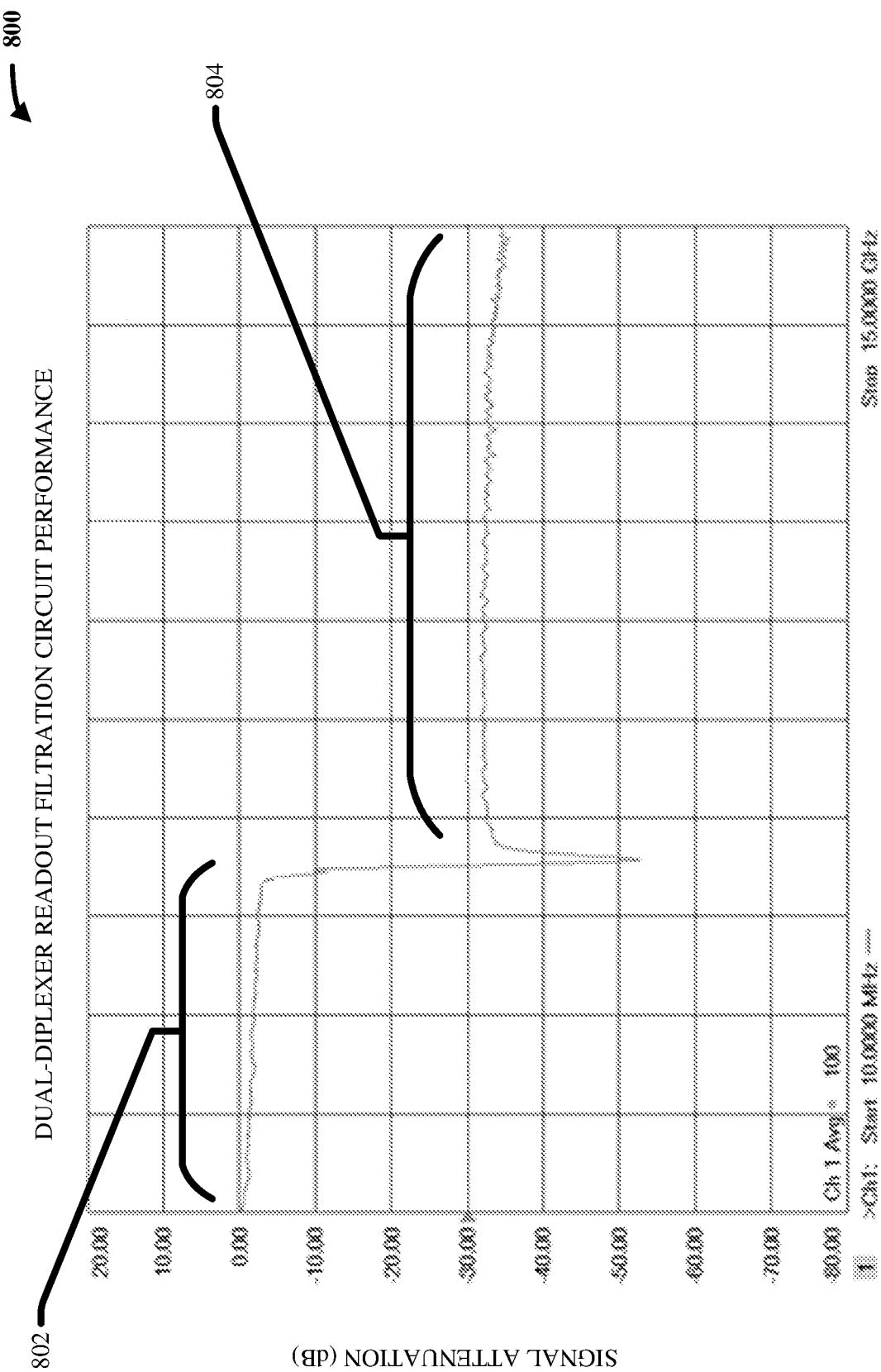
FIG. 8 illustrates a non-limiting graph of experimental results pertaining to a dual-diplexer circuit in accordance with one or more embodiments described herein.

FIG. 8 illustrates a non-limiting graph 800 of experimental results pertaining to a dual-diplexer circuit in accordance with one or more embodiments described herein. In other words, the present inventors reduced to practice an embodiment in accordance with FIGS. 5-7 and experimentally validated the performance of such embodiment.

Specifically, the present inventors constructed a dual-diplexer circuit as shown in FIG. 5-7, and the present inventors measured the amount of attenuation achieved by such dual-diplexer circuit. The resulting measurements are plotted in the graph 800. As shown, the abscissa (e.g., x-axis) of the graph 800 can represent signal frequency (e.g., as measured in mega Hertz and/or giga Hertz, and/or ranging from 10 mega Hertz to 15 giga Hertz), and the ordinate (e.g., y-axis) of the graph 800 can represent signal attenuation (e.g., as measured in decibels, and/or ranging from −80 decibels to +20 decibels). As shown, when the frequency filters 602 and 702 are mirrored LC low-pass filters (e.g., as shown in FIGS. 6-7), when the frequency filters 604 and 704 are mirrored LC high-pass filters (e.g., as shown in FIGS. 6-7), and when the attenuator 510 is located between the frequency filters 604 and 704 (e.g., as shown in FIG. 5), a low-end range of the frequency spectrum (denoted by numeral 802) can experience no and/or negligible attenuation (e.g., nearly zero decibels of attenuation), whereas a high-end range of the frequency spectrum (denoted by numeral 804) can experience significant and/or non-negligible attenuation (e.g., about −32 decibels of attenuation). Moreover, as those having ordinary skill in the art will appreciate, no significant ripple is present in the high-end range of the frequency spectrum despite such significant and/or non-negligible attenuation.

Note that, although the graph 800 depicts about −32 decibels of attenuation, this is a mere non-limiting example for purposes of explanation. Any suitable amount of attenuation (e.g., more and/or less than −32 decibels) can be achieved by controllably adjusting/modifying the characteristics of the attenuator 510 (and/or by adding one or more other attenuators in series with the attenuator 510).

Figure 9:
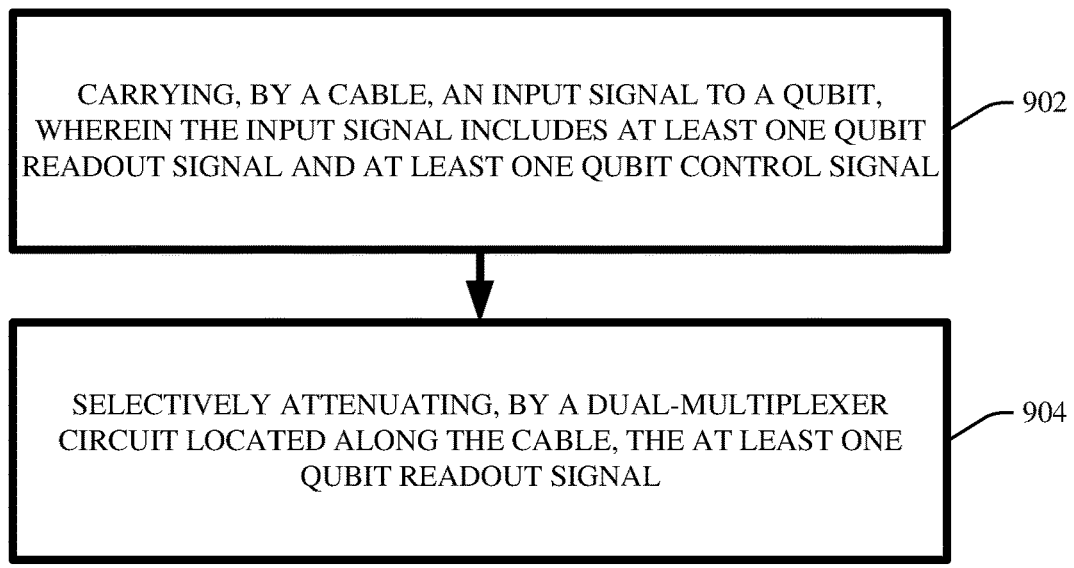
FIG. 9 illustrates a flow diagram of an example, non-limiting method that facilitates dual-multiplexer filtration of inputted qubit readout signals in accordance with one or more embodiments described herein.

FIG. 9 illustrates a flow diagram of an example, non-limiting method 900 that can facilitate dual-multiplexer filtration of inputted qubit readout signals in accordance with one or more embodiments described herein.

In various embodiments, act 902 can include transmitting, by a cable (e.g., 106), an input signal (e.g., 110) to a qubit (e.g., 104). In various cases, the input signal can include at least one qubit readout signal (e.g., 216) and/or at least one qubit control signal (e.g., 214).

In various aspects, act 904 can include selectively attenuating, by a dual-multiplexer circuit (e.g., 108) located along the cable, the at least one qubit readout signal.

Although not explicitly shown in FIG. 9, the dual-multiplexer circuit can include a first multiplexer (e.g., 202) and/or a second multiplexer (e.g., 204) coupled together by a set of wires (e.g., 206). In various cases, at least one first wire (e.g., 210) of the set of wires can be outfitted with one or more attenuators (e.g., 212).

Although not explicitly shown in FIG. 9, the selectively attenuating can comprise: frequency-splitting, by the first multiplexer (e.g., 202), the input signal into the at least one qubit readout signal (e.g., 216) and the at least one qubit control signal (e.g., 214); passing, by the at least one first wire (e.g., 210), the at least one qubit readout signal through the one or more attenuators (e.g., 212), thereby yielding at least one attenuated qubit readout signal (e.g., 218); transmitting, by the at least one first wire (e.g., 210), the at least one attenuated qubit readout signal (e.g., 218) to the second multiplexer (e.g., 204); transmitting, by a remainder of the set of wires (e.g., 208), the at least one qubit control signal (e.g., 214) to the second multiplexer (e.g., 204); and/or frequency-combining, by the second multiplexer (e.g., 204), the at least one qubit control signal (e.g., 214) with the at least one attenuated qubit readout signal (e.g., 218).

Although not explicitly shown in FIG. 9, the first multiplexer can include a set of first frequency filters (e.g., 302) that respectively correspond to the set of wires (e.g., 206), and/or the second multiplexer can include a set of second frequency filters (e.g., 402) that respectively mirror the set of first frequency filters.

Furthermore, in various embodiments described herein, there can be an apparatus that comprises a first multiplexer (e.g., 502) that can split an input signal (e.g., 110) into a qubit readout signal (e.g., 514) and/or a qubit control signal (e.g., 512). In various instances, the apparatus can further comprise a first wire (e.g., 508) that passes the qubit readout signal through at least one attenuator (e.g., 510), thereby yielding an attenuated qubit readout signal (e.g., 516).

In various aspects, the first wire can transmit the attenuated qubit readout signal (e.g., 516) to a second multiplexer (e.g., 504), and the apparatus can further comprise: a second wire (e.g., 506) that can transmit the qubit control signal (e.g., 512) to the second multiplexer (e.g., 504). In various cases, the second multiplexer can combine the attenuated qubit readout signal (e.g., 516) with the qubit control signal (e.g., 512).

Further still, in various embodiments described herein, there can be an apparatus that comprises a signal generator (e.g., 102) coupled, by an input cable (e.g., 106), to a qubit (e.g., 104), where the apparatus can further comprise a dual-multiplexer circuit (e.g., 108) fabricated on the input cable. In various aspects, the dual-multiplexer circuit can comprise: a first multiplexer (e.g., 202) and a second multiplexer (e.g., 204); at least one first wire (e.g., 208) coupling the first multiplexer to the second multiplexer, wherein the at least one first wire can lack any attenuators; and at least one second wire (e.g., 210) coupling the first multiplexer to the second multiplexer, wherein the at least one second wire can be outfitted with at least one attenuator (e.g., 212). In various instances, the first multiplexer, the at least one first wire, the at least one second wire, the at least one attenuator, and/or the second multiplexer can be located within a cryostat. In various cases, the at least one second wire can be associated with at least one high-pass filter of the first multiplexer and at least one mirrored high-pass filter of the second multiplexer, with at least one low-pass filter of the first multiplexer and at least one mirrored low-pass filter of the second multiplexer, and/or with at least one band-pass filter of the first multiplexer and at least one mirrored band-pass filter of the second multiplexer.

Accordingly, various embodiments described herein can be considered as systems and/or techniques for facilitating dual-multiplexer filtration of inputted qubit readout signals. Such embodiments can perform selective attenuation of inputted qubit readout signals without commensurately attenuating inputted qubit control signals. Accordingly, thermal photons can be prevented/impeded from entering quantum readout cavities, and quantum gates can nevertheless be performed without excessive slowness. Furthermore, such embodiments can facilitate such selective attenuation without experiencing the concomitant excess thermal noise, the concomitant excess room temperature amplification, and/or the concomitant excess signal ripple that plague existing techniques. Such embodiments thus certainly qualify as concrete and tangible technical improvements in the field of qubit readout.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or transmit out combinations of special purpose hardware and computer instructions.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
a cable configured to transmit an input signal to a qubit, the input signal including comprising at least one qubit readout signal and at least one qubit control signal; and
a dual-multiplexer circuit located along the cable configured to selectively attenuate the at least one qubit readout signal, wherein the dual-multiplexer circuit comprises:
a first multiplexer and a second multiplexer coupled together by a group of wires, wherein the first multiplexer is configured to:
receive the input signal,
separate each qubit readout signal of the at least one qubit readout signal, and
separate each qubit control signal of the at least one qubit control signal;
for each qubit readout signal of the at least one qubit readout signal:
a respective first wire of the group of wires that couples a respective output of the first multiplexer associated with the qubit readout signal to a respective attenuator associated with the qubit readout signal, wherein the respective attenuator attenuates the qubit readout signal to generate a respective attenuated qubit readout signal, and
a respective second wire of the group of wires that couples the respective attenuator associated with the respective attenuated qubit readout signal to a respective input of the second multiplexer associated with the respective attenuated qubit readout signal; and for each qubit control signal of the at least one qubit control signal, a respective third wire of the group of wires that couples a respective output of the first multiplexer associated with the qubit control signal to a respective input of the second multiplexer associated with the qubit control signal, wherein the respective third wire does not employ any attenuator for the qubit control signal, and wherein the second multiplexer is configured to:
combine the qubit control signal with the respective modified qubit readout signal to output a modified input signal.

2. The device of claim 1, wherein the second multiplexer is further configured to combine a group of qubit readout signals of the at least one qubit control signal with a group of respective modified qubit readout signals of the at least one qubit readout signal to output the modified input signal.

3. The device of claim 1, wherein the first multiplexer is configured to frequency-split the input signal into the at least one qubit readout signal and the at least one qubit control signal, and wherein the second multiplexer is configured to frequency-combine the at least one qubit control signal with the at least one attenuated qubit readout signal.

4. The device of claim 1, wherein the first multiplexer comprises a set of first frequency filters that respectively correspond to the group of wires, and wherein the second multiplexer comprises a set of second frequency filters that respectively mirror the set of first frequency filters.

5. The device of claim 4, wherein the set of first frequency filters and the set of second frequency filters comprise at least one of a low-pass filter, a band-pass filter, or a high-pass filter.

6. The device of claim 1, wherein the respective attenuator comprises a nickel-chrome attenuator or a directional-coupler attenuator.

7. The device of claim 1, wherein the dual-multiplexer circuit is located within a cryostat.

8. A method, comprising:
transmitting, by a cable, an input signal to a qubit, the input signal comprising at least one qubit readout signal and at least one qubit control signal; and
selectively attenuating, by a dual-multiplexer circuit located along the cable, the at least one qubit readout signal, wherein the dual-multiplexer circuit comprises:
a first multiplexer and a second multiplexer coupled together by a group of wires, wherein the first multiplexer is configured to:
receive the input signal,
separate each qubit readout signal of the at least one qubit readout signal, and
separate each qubit control signal of the at least one qubit control signal;
for each qubit readout signal of the at least one qubit readout signal:
a respective first wire of the group of wires that couples a respective output of the first multiplexer associated with the qubit readout signal to a respective attenuator associated with the qubit readout signal, wherein the respective attenuator attenuates the qubit readout signal to generate a respective attenuated qubit readout signal, and
a respective second wire of the group of wires that couples the respective attenuator associated with the respective attenuated qubit readout signal to a respective input of the second multiplexer associated with the respective attenuated qubit readout signal; and for each qubit control signal of the at least one qubit control signal, a respective third wire of the group of wires that couples a respective output of the first multiplexer associated with the qubit control signal to a respective input of the second multiplexer associated with the qubit control signal, wherein the respective third wire does not employ any attenuator for the qubit control signal, and wherein the second multiplexer is configured to:
combine the qubit control signal with the respective modified qubit readout signal to output a modified input signal.

9. The method of claim 8, wherein the second multiplexer is further configured to combine a group of qubit readout signals of the at least one qubit control signal with a group of respective modified qubit readout signals of the at least one qubit readout signal to output the modified input signal.

10. The method of claim 8, wherein the selectively attenuating comprises:
frequency-splitting, by the first multiplexer, the input signal into the at least one qubit readout signal and the at least one qubit control signal; and
frequency-combining, by the second multiplexer, the at least one qubit control signal with the at least one attenuated qubit readout signal.

11. The method of claim 8, wherein the first multiplexer comprises a set of first frequency filters that respectively correspond to the group of wires, and wherein the second multiplexer comprises a set of second frequency filters that respectively mirror the set of first frequency filters.

12. The method of claim 11, wherein the set of first frequency filters and the set of second frequency filters comprise at least one of a low-pass filter, a band-pass filter, or a high-pass filter.

13. The method of claim 8, wherein the respective attenuator comprises a nickel-chrome attenuator or a directional-coupler attenuator.

14. The method of claim 8, wherein the dual-multiplexer circuit is located within a cryostat.

15. An apparatus, comprising:
a signal generator coupled, by an input cable, to a qubit; and
a dual-multiplexer circuit fabricated on the input cable, wherein the dual-multiplexer circuit comprises:
a first multiplexer and a second multiplexer coupled together by a group of wires, wherein the first multiplexer is configured to:
receive an input signal comprising at least one qubit readout signal and at least one qubit control signal,
separate each qubit readout signal of the at least one qubit readout signal, and
separate each qubit control signal of the at least one qubit control signal;
for each qubit readout signal of the at least one qubit readout signal:
a respective first wire of the group of wires that couples a respective output of the first multiplexer associated with the qubit readout signal to a respective attenuator associated with the qubit readout signal, wherein the respective attenuator attenuates the qubit readout signal to generate a respective attenuated qubit readout signal, and
a respective second wire of the group of wires that couples the respective attenuator associated with the respective attenuated qubit readout signal to a respective input of the second multiplexer associated with the respective attenuated qubit readout signal; and for each qubit control signal of the at least one qubit control signal, a respective third wire of the group of wires that couples a respective output of the first multiplexer associated with the qubit control signal to a respective input of the second multiplexer associated with the qubit control signal, wherein the respective third wire does not employ any attenuator for the qubit control signal, and wherein the second multiplexer is configured to:

combine the qubit control signal with the respective modified qubit readout signal to output a modified input signal.

16. The apparatus of claim 15, wherein the second multiplexer is further configured to combine a group of qubit readout signals of the at least one qubit control signal with a group of respective modified qubit readout signals of the at least one qubit readout signal to output the modified input signal.

17. The apparatus of claim 15, wherein the dual-multiplexer circuit is located within a cryostat.

18. The apparatus of claim 15, wherein the first multiplexer comprises a set of first frequency filters that respectively correspond to the group of wires, and wherein the second multiplexer comprises a set of second frequency filters that respectively mirror the set of first frequency filters.

19. The apparatus of claim 18, wherein the set of first frequency filters and the set of second frequency filters comprise at least one of a low-pass filter, a band-pass filter, or a high-pass filter.

20. The apparatus of claim 15, wherein the respective attenuator comprises a nickel-chrome attenuator or a directional-coupler attenuator.

* * * * *